United States Patent
Liu et al.

(10) Patent No.: US 10,721,111 B2
(45) Date of Patent: Jul. 21, 2020

(54) COMMUNICATION METHOD AND APPARATUS

(71) Applicant: HUAWEI TECHNOLOGIES CO., LTD., Shenzhen, Guangdong (CN)

(72) Inventors: Fengwei Liu, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/556,946

(22) Filed: Aug. 30, 2019

(65) Prior Publication Data

US 2019/0386867 A1    Dec. 19, 2019

Related U.S. Application Data

(63) Continuation of application No. PCT/CN2018/109812, filed on Oct. 11, 2018.

(30) Foreign Application Priority Data

Oct. 11, 2017   (CN) .......................... 2017 1 0943156
Feb. 13, 2018   (CN) .......................... 2018 1 0150923

(51) Int. Cl.
    *H04L 1/00*    (2006.01)
    *H04L 27/26*   (2006.01)
    (Continued)

(52) U.S. Cl.
    CPC ........ *H04L 27/2627* (2013.01); *H04L 1/0003* (2013.01); *H04L 27/36* (2013.01); *H04W 72/04* (2013.01); *H04W 72/12* (2013.01)

(58) Field of Classification Search
    CPC .................................................. H04L 27/2627
    See application file for complete search history.

(56) References Cited

U.S. PATENT DOCUMENTS 9,648,601 B2     5/2017  Wang et al.
2011/0103335 A1*  5/2011  Golitschek Edler von
                                 Elbwart ................ H04L 1/0026
                                                            370/329

(Continued)

FOREIGN PATENT DOCUMENTS

CN   102113258 A   6/2011
CN   104184556 A  12/2014
(Continued)

OTHER PUBLICATIONS

3GPP TS 38.214 V15.2.0 (Jun. 2018), "3rd Generation Partnership Project; Technical Specification Group Radio Access Network; NR; Physical layer procedures for data (Release 15)," Jun. 2018, 95 pages.

(Continued)

*Primary Examiner* — John D Blanton
(74) *Attorney, Agent, or Firm* — Fish & Richardson P.C.

(57) ABSTRACT

Embodiments of this application provide a communication method and an apparatus. A correspondence between a plurality of MCS indexes and a plurality of modulation schemes is provided to achieve flexible selection of a modulation scheme. In the correspondence, at least one MCS index of the plurality of MCS indexes corresponds to a set modulation schemes which comprises π/2 binary phase shift keying (π/2-BPSK) modulation and quadrature phase shift keying (QPSK) modulation. A first communication device receives a target modulation and coding scheme (MCS) index from a second communication device, determines a target modulation scheme corresponding to the target index number based on the correspondence, and performs communication with the second communication device based on the target modulation scheme.

19 Claims, 5 Drawing Sheets

(51) Int. Cl.
  *H04L 27/36*  (2006.01)
  *H04W 72/04*  (2009.01)
  *H04W 72/12*  (2009.01)

(56) References Cited

U.S. PATENT DOCUMENTS

| | | | |
|---|---|---|---|
| 2013/0128846 A1 | 5/2013 | Golitschek Edler Von Elbwart et al. | |
| 2016/0226621 A1* | 8/2016 | Ljung | H04L 1/0003 |
| 2017/0201989 A1 | 7/2017 | Fakoorian et al. | |
| 2017/0289995 A1 | 10/2017 | Lin et al. | |
| 2018/0115388 A1 | 4/2018 | Ljung et al. | |
| 2019/0044646 A1* | 2/2019 | Xu | H04W 4/80 |

FOREIGN PATENT DOCUMENTS

| | | | |
|---|---|---|---|
| CN | 106230767 | A | 12/2016 |
| CN | 106559171 | A | 4/2017 |
| CN | 107046453 | A | 8/2017 |
| CN | 107196735 | A | 9/2017 |
| CN | 107210844 | A | 9/2017 |
| EP | 2879427 | A1 | 6/2015 |
| EP | 3226639 | A1 | 10/2017 |
| EP | 3355502 | A1 | 8/2018 |
| WO | 2017065942 | A1 | 4/2017 |

OTHER PUBLICATIONS

3GPP TS 38.211 V1.0.0 (Sep. 2017), "3rd Generation Partnership Project; Technical Specification Group Radio Access Network; NR; Physical channels and modulation (Release 15)," Sep. 2017, 37 pages.
3GPP TS 38.214 V1.0.0 (Sep. 2017), "3rd Generation Partnership Project; Technical Specification Group Radio Access Network; NR; Physical layer procedures for data (Release 15)," Sep. 2017, 32 pages.
3GPP TS 38.331 V0.1.0 (Oct. 2017), "3rd Generation Partnership Project; Technical Specification Group Radio Access Network; NR; Radio Resource Control (RRC); Protocol specification (Release 15)," Oct. 2017, 42 pages.
PCT International Search Report and Written Opinion issued in International Application No. PCT/CN2018/109812 dated Dec. 29, 2018, 13 pages (with English translation).
Search Report issued in Chinese Application No. 201810857753.2 dated Sep. 12, 2018, 7 pages.
Office Action issued in Chinese Application No. 201910978228.0 dated May 8, 2020, 17 pages (with English translation).
Extended European Search Report issued in European Application No. 18866157.3 dated May 8, 2020, 10 pages.
Sony, "Supporting lower order modulation for L TE-MTC Uplink," 3GPP TSG RAN WG1 Meeting #80, R1-150427; Athens, Greece, Feb. 9-13, 2015, 3 pages.

* cited by examiner

COMMUNICATION METHOD AND APPARATUS

CROSS-REFERENCE TO RELATED APPLICATIONS

This application is a continuation of International Application No. PCT/CN2018/109812, filed on Oct. 11, 2018, which claims priority to Chinese Patent Application No. 201810150923.3, filed on Feb. 13, 2018, which claims priority to Chinese Patent Application No. 201710943156.7, filed on Oct. 11, 2017, The disclosures of the aforementioned applications are incorporated herein by reference in their entireties.

TECHNICAL FIELD

This application relates to the field of communications technologies, and in particular, to a communication method and an apparatus.

BACKGROUND

A new generation wireless communications system (NR) includes an operating frequency band above 6 GHz. To increase coverage when a power amplification capability is limited, a discrete Fourier transform spread orthogonal frequency division multiplexing (DFT-S-OFDM) waveform is used as a supplement to an OFDM waveform in an uplink of the NR. To further reduce a peak-to-average power ratio (PAPR) of the DFT-S-OFDM waveform, $\pi/2$-binary phase shift keying ($\pi/2$-BPSK) modulation and frequency domain spectral shaping (FDSS) technologies are introduced in the NR. An applicable range of $\pi/2$-BPSK modulation overlaps that of existing quadrature phase shift keying (QPSK) modulation. When a network device such as an NR base station (gNB) schedules user equipment in an overlapping area, a decision needs to be flexibly made between the two modulation schemes depending on an actual scenario. A modulation and coding scheme (MCS) table provides support for a modulation scheme used for communication between the network device and the user equipment.

Currently, there are mainly two types of MCS tables that provide a modulation scheme for communication between the network device and the user equipment. On one hand, in an MCS table of 802.11ad, a plurality of high-code-rate MCSs with $\pi/2$-BPSK are used. However, in a case of same spectral efficiency, low-code-rate QPSK generally can provide better performance. In addition, the MCS table of 802.11ad lacks coverage of some low-code-rate QPSK. On the other hand, in a cellular-based Narrowband Internet of Things (NB-IoT) MCS table, $\pi/2$-BPSK modulation is used for MCSs 0 and 1, and QPSK modulation is used for other MCSs. However, in the NR, for the two modulation schemes, a larger signal-to-noise ratio range may be covered, scenarios of different bandwidths need to be considered, and a fixed MCS configuration of the NB-IoT is difficult to satisfy an NR requirement.

Therefore, flexibly selecting a modulation scheme in the NR by the network device is a problem to be resolved urgently at present.

SUMMARY

Embodiments of this application provide a communication method and an apparatus, so that a network device can flexibly select a modulation scheme in NR.

To achieve the foregoing objective, the following technical solutions are used in the embodiments of this application:

According to one aspect, a communication method is provided, where the method includes: determining, by a network device based on a correspondence between an index number and a modulation scheme, a modulation scheme corresponding to a target index number, where the correspondence between an index number and a modulation scheme includes that each index number is corresponding to one modulation scheme set, the modulation scheme set includes at least one modulation scheme, each of K modulation scheme sets includes $\pi/2$ binary phase shift keying $\pi/2$-BPSK modulation or quadrature phase shift keying QPSK modulation, and K is an integer greater than 0; and performing, by the network device, communication based on the modulation scheme corresponding to the target index number. According to the communication method provided in this embodiment of this application, the network device can flexibly select, by using at least one modulation scheme included in one modulation scheme set, a modulation scheme for communicating with user equipment.

In a possible implementation, the method further includes: determining, by the network device, a target MCS table, where the target MCS table includes the K modulation scheme sets. Based on this solution, the network device can determine a same MCS table used when communicating with the user equipment.

In a possible implementation, the target MCS table includes the K modulation scheme sets, in the K modulation scheme sets, each of K1 modulation scheme sets includes $\pi/2$-BPSK modulation, and each of (K−K1) modulation scheme sets includes QPSK modulation, where K1 is an integer, $0 \le K1 \le K$, and $0 \le (K-K1) \le K$. Alternatively, the target MCS table includes the K modulation scheme sets and N modulation scheme sets, each of the N modulation scheme sets includes multiple quadrature amplitude modulation M-QAM or $\pi/2$-BPSK modulation, and N and M are positive integers. Based on this solution, the network device can flexibly select a proper target MCS table from MCS tables in different configuration manners, so as to provide a basis for selecting, by the network device, a debugging scheme for communication between the user equipment and the user equipment.

In a possible implementation, if coding schemes corresponding to the N modulation scheme sets are the same as coding schemes corresponding to the K modulation scheme sets, modulation schemes in the N modulation scheme sets are $\pi/2$-BPSK modulation, where $N \le M$.

In a possible implementation, the determining, by the network device, a target MCS table includes: determining, by the network device, the target MCS table based on a type of the user equipment; or determining, by the network device, the target MCS table based on a target transmission mode, where the target transmission mode is a frequency domain spectral shaping FDSS technology or a coverage enhancement mode; or determining, by the network device, the target MCS table based on a bandwidth range used by the user equipment; or determining, by the network device, the target MCS table based on a frequency band used by the user equipment. Based on this solution, the network device can select target MCS tables in different configuration manners for communication between the network device and the user equipment based on different determining manners, and this can provide a basis for flexible selection of a modulation scheme for communication between the network device and the user equipment.

In a possible implementation, the method further includes: sending, by the network device, indication information of the target MCS table to the user equipment, where the indication information of the target MCS table is used to indicate information about the target MCS table. Based on this solution, the user equipment can determine the target MCS table according to the indication information that is of the target MCS table and that is sent by the network device.

In a possible implementation, the method further includes: receiving, by the network device, indication information that is of the target MCS table and that is sent by the user equipment, where the indication information of the target MCS table is used to indicate information about the target MCS table; and the determining, by the network device, a target MCS table includes: determining, by the network device, the target MCS table according to the indication information of the target MCS table. Based on this solution, the network device can determine the target MCS table according to the indication information that is of the target MCS table and that is sent by the user equipment.

In a possible implementation, the method further includes: determining, by the network device, modulation schemes in the K modulation scheme sets in the target MCS table based on an initial table. Based on this solution, the network device can determine a specific configuration of the target MCS table, so as to avoid a problem that when the network device uses the target MCS table, poor experience is caused because an MCS defined in the table does not match an MCS required by an actual application scenario.

In a possible implementation, if the modulation schemes included in the K modulation scheme sets in the initial table are π/2-BPSK modulation and QPSK modulation, the determining, by the network device, modulation schemes in the K modulation scheme sets in the target MCS table includes: determining, by the network device, that modulation schemes in K2 modulation scheme sets in the K modulation scheme sets in the target MCS table are π/2-BPSK modulation, and modulation schemes in (K−K2) modulation scheme sets in the K modulation scheme sets are QPSK modulation, where K2 is an integer, and 0≤K2≤K, or if initial modulation schemes in the K modulation scheme sets in the initial table are QPSK modulation, the determining, by the network device, modulation schemes in the K modulation scheme sets in the target MCS table includes: determining, by the network device, that modulation schemes in K2 modulation scheme sets in the K modulation scheme sets in the target MCS table are π/2-BPSK modulation, where 0≤K2≤K. Based on this solution, an undetermined modulation scheme in the initial table is flexibly configured as a determined modulation scheme, or a modulation scheme in a conventional table is configured as π/2-BPSK modulation, and this provides a basis for selecting a modulation scheme for communication between the network device and the user equipment and is applicable to an NR system.

In a possible implementation, the K modulation scheme sets in the initial table include A modulation scheme sets, B modulation scheme sets, and C modulation scheme sets. Each of the A modulation scheme sets includes only π/2-BPSK modulation, each of the B modulation scheme sets includes only QPSK modulation, each of the C modulation scheme sets includes π/2-BPSK modulation and QPSK modulation, A, B, and C are integers, 0≤A≤K, 0≤B≤K, and 0≤C≤K Alternatively, the K modulation scheme sets in the initial table include A modulation scheme sets and B modulation scheme sets. Each of the A modulation scheme sets includes only π/2-BPSK modulation, and each of the B modulation scheme sets includes only QPSK modulation. The initial table further includes D modulation scheme sets, and each of the D modulation scheme sets includes π/2-BPSK modulation and M-QAM modulation. A, B, and D are integers, 0≤A≤K 0≤B≤K, and 0<D≤B.

In a possible implementation, the initial table includes at least K modulation scheme sets, and the K modulation scheme sets include A modulation scheme sets and B modulation scheme sets. Each of the A modulation scheme sets includes π/2-BPSK modulation, and each of the B modulation scheme sets includes QPSK modulation. The MCS initial table further includes E modulation scheme sets, and each of the E modulation scheme sets includes M-QAM modulation. M-QAM modulation in the E modulation scheme sets may be modified to π/2-BPSK modulation, and the E modulation scheme sets are modulation scheme sets that are different from the K modulation scheme sets in the initial table, where A, B, and E are integers, M is a positive integer, 0≤A≤K, 0≤B≤K, and 0<E≤B.

In a possible implementation, the method further includes: sending, by the network device, modulation scheme configuration information to the user equipment, where the modulation scheme configuration information is used to indicate information about the modulation schemes that are in the K modulation scheme sets in the target MCS table and that are determined by the network device.

In a possible implementation, the method further includes: receiving, by the network device, modulation scheme configuration information sent by the user equipment, where the modulation scheme configuration information is used to indicate information about modulation schemes that are in the K modulation scheme sets in the target MCS table and that are determined by the user equipment; and the determining, by the network device, modulation schemes in the K modulation scheme sets in the target MCS table based on an initial table includes: determining, by the network device, the modulation schemes in the K modulation scheme sets in the target MCS table based on the modulation scheme configuration information.

In a possible implementation, the method further includes: updating, by the network device, a modulation scheme in the K modulation scheme sets in the target MCS table. Based on this solution, the network device can update the modulation scheme in the target MCS table, and can flexibly perform updating depending on an application scenario, and this provides a basis for flexible selection of a modulation scheme for communication between the network device and the user equipment.

In a possible implementation, the method further includes: sending, by the network device, update indication information to the user equipment, where the update indication information is used to indicate information about the modulation scheme that is in the K modulation scheme sets in the target MCS table and that is updated by the network device. Based on this solution, the network device can instruct the user equipment to use the target MCS table updated by the network device.

In a possible implementation, the method further includes: receiving, by the network device, update indication information sent by the user equipment, where the update indication information is used to indicate information about the modulation scheme that is in the K modulation scheme sets in the target MCS table and that is to be updated by the network device; and the updating, by the network device, a modulation scheme in the K modulation scheme sets in the target MCS table includes: updating, by the network device, the modulation scheme in the K modulation scheme sets in the target MCS table according to the update indication information. Based on this solution, the network device can update the modulation scheme in the target MCS table, and can flexibly perform updating depending on an application scenario, and this provides a basis for flexible selection of a modulation scheme for communication between the network device and the user equipment.

In a possible implementation, the method further includes: determining, by the network device, a value of a target parameter or a target preset correspondence, where the target parameter includes a maximum output power gain, a carrier frequency range, or a bandwidth range, and the target preset correspondence includes a preset correspondence between values of target parameters and modulation schemes in the K modulation scheme sets; and the updating, by the network device, a modulation scheme in the K modulation scheme sets in the target MCS table includes: updating, by the network device, the modulation scheme in the K modulation scheme sets in the target MCS table based on the target parameter or the target preset correspondence. Based on this solution, the network device can update the target MCS table on the network device side based on the target parameter or the target preset correspondence.

In a possible implementation, the determining, by the network device, a value of a target parameter or a target preset correspondence includes: determining, by the network device, the value of the target parameter or the target preset correspondence based on configuration information of the target parameter, where the configuration information of the target parameter includes the maximum output power gain, the carrier frequency range, the bandwidth range, and/or a correspondence determined by the user equipment. Based on this solution, the network device can determine the value of the target parameter or the target preset correspondence.

In a possible implementation, the method further includes: receiving, by the network device, configuration information that is of the target parameter and that is sent by the user equipment, where the configuration information of the target parameter includes the maximum output power gain, the carrier frequency range, the bandwidth range, and/or a correspondence determined by the user equipment; and sending, by the network device, acknowledgement configuration information of the target parameter to the user equipment. Based on this solution, the network device can determine the value of the target parameter or the target preset correspondence based on the configuration information that is of the target parameter and that is sent by the user equipment, so that the network device can update the target MCS table based on the value of the target parameter or the target preset correspondence.

In a possible implementation, the determining, by the network device, a target MCS table includes: specifying, by the network device, an MCS table as the target MCS table; or receiving, by the network device, a first MCS table sent by the user equipment, where the first MCS table is a target MCS table determined by the user equipment; and determining, by the network device, the target MCS table based on the first MCS table. Based on this solution, the network device can select tables in different configuration manners for communication between the network device and the user equipment based on different determining manners, and this can provide a basis for flexible selection of a modulation scheme for communication between the network device and the user equipment.

In a possible implementation, the indication information of the target MCS table is sent by the network device to the user equipment by using downlink control information DCI, radio resource control RRC signaling, or a media access control control element MAC CE.

In a possible implementation, the update indication information is sent by the network device to the user equipment by using the DCI, the RRC signaling, or the MAC CE.

In a possible implementation, the configuration information of the target parameter is sent by the network device to the user equipment by using the DCI, the RRC, or the MAC CE.

According to another aspect, a communication method is provided, where the method includes: determining, by user equipment based on a correspondence between an index number and a modulation scheme, a modulation scheme corresponding to a target index number, where the correspondence between an index number and a modulation scheme includes that each index number is corresponding to one modulation scheme set, the modulation scheme set includes at least one modulation scheme, each of K modulation scheme sets includes $\pi/2$ binary phase shift keying $\pi/2$-BPSK modulation or quadrature phase shift keying QPSK modulation, and K is an integer greater than 0; and performing, by the user equipment, communication based on the modulation scheme corresponding to the target index number. According to the communication method provided in this embodiment of this application, the user equipment can flexibly select, by using at least one modulation scheme included in one modulation scheme set, a modulation scheme for communicating with a network device.

In a possible implementation, the method further includes: determining, by the user equipment, a target MCS table, where the target MCS table includes the K modulation scheme sets. Based on this solution, the user equipment can determine a same MCS table used when communicating with the network device.

In a possible implementation, the target MCS table includes the K modulation scheme sets, in the K modulation scheme sets, each of K1 modulation scheme sets includes $\pi/2$-BPSK modulation, and each of (K−K1) modulation scheme sets includes QPSK modulation, where K1 is an integer, $0 \leq K1 \leq K$, and $0 \leq (K-K1) \leq K$. Alternatively, the target MCS table includes the K modulation scheme sets and N modulation scheme sets, each of the N modulation scheme sets includes multiple quadrature amplitude modulation M-QAM or $\pi/2$-BPSK modulation, and N and M are integers. Based on this solution, the user equipment can flexibly select a proper target MCS table from MCS tables in different configuration manners, so as to provide a basis for selecting a modulation scheme for communication between the network device and the user equipment.

In a possible implementation, the method further includes: if coding schemes corresponding to the N modulation scheme sets are the same as coding schemes corresponding to the K modulation scheme sets, modulation schemes in the N modulation scheme sets are $\pi/2$-BPSK modulation, where $N \leq M$.

In a possible implementation, the determining, by the user equipment, a target MCS table includes: determining, by the user equipment, the target MCS table based on a type of the user equipment; or determining, by the user equipment, the target MCS table based on a target transmission mode, where the target transmission mode is a frequency domain spectral shaping FDSS technology or a coverage enhancement mode; or determining, by the user equipment, the target MCS table based on a bandwidth range used by the user equipment; or determining, by the user equipment, the target MCS table based on a frequency band used by the user equipment. Based on this solution, the user equipment can select target MCS tables in different configuration manners for communication between the user equipment and the network device based on different determining manners, and this can provide a basis for flexible selection of a modulation scheme for communication between the user equipment and the network device.

In a possible implementation, the method further includes: sending, by the user equipment, indication information of the target MCS table to the network device, where the indication information of the target MCS table is used to indicate information about the target MCS table. Based on this solution, the network device can determine the target MCS table according to the indication information that is of the target MCS table and that is sent by the user equipment.

In a possible implementation, the method further includes: receiving, by the user equipment, indication information that is of the target MCS table and that is sent by the network device, where the indication information of the target MCS table is used to indicate information about the target MCS table; and the determining, by the user equipment, a target MCS table includes: determining, by the user equipment, the target MCS table according to the indication information of the target MCS table. Based on this solution, the user equipment can determine the target MCS table according to an indication of the network device.

In a possible implementation, the user equipment sends a first MCS table to the network device, where the first MCS table is the target MCS table determined by the user equipment. Based on this solution, the user equipment can feed back a to-be-used MCS table that is determined by the user equipment. The network device can determine, based on the first table sent by the user equipment, whether the first table is suitable for a target MAC table.

In a possible implementation, the method further includes: determining, by the user equipment, modulation schemes in the K modulation scheme sets in the target MCS table based on an initial table. Based on this solution, the user equipment can determine a specific configuration of the target MCS table, so as to avoid a problem that when the user equipment uses the target MCS table, poor experience is caused because an MCS defined in the table does not match an MCS required by an actual application scenario.

In a possible implementation, if the modulation schemes included in the K modulation scheme sets in the initial table are π/2-BPSK modulation and QPSK modulation, the determining, by the user equipment, modulation schemes in the K modulation scheme sets in the target MCS table includes: determining, by the user equipment, that modulation schemes in K2 modulation scheme sets in the K modulation scheme sets in the target MCS table are π/2-BPSK modulation, and modulation schemes in (K−K2) modulation scheme sets in the K modulation scheme sets are QPSK modulation, where K2 is an integer, and 0<K2<K; or if initial modulation schemes in the K modulation scheme sets in the initial table are QPSK modulation, the determining, by the user equipment, modulation schemes in the K modulation scheme sets in the target MCS table includes: determining, by the user equipment, that modulation schemes in K2 modulation scheme sets in the K modulation scheme sets in the target MCS table are π/2-BPSK modulation, where 0≤K2≤K. Based on this solution, an undetermined modulation scheme in the initial table is flexibly configured as a determined modulation scheme, or a modulation scheme in a conventional table is configured as π/2-BPSK modulation, and this provides a basis for selecting a modulation scheme for communication between the user equipment and the network device and is applicable to an NR system.

In a possible implementation, the K modulation scheme sets in the initial table include A modulation scheme sets, B modulation scheme sets, and C modulation scheme sets. Each of the A modulation scheme sets includes only π/2-BPSK modulation, each of the B modulation scheme sets includes only QPSK modulation, each of the C modulation scheme sets includes π/2-BPSK modulation and QPSK modulation, A, B, and C are integers, 0≤A≤K, 0≤B≤K, and 0≤C≤K. Alternatively, the K modulation scheme sets in the initial table include A modulation scheme sets and B modulation scheme sets. Each of the A modulation scheme sets includes only π/2-BPSK modulation, and each of the B modulation scheme sets includes only QPSK modulation. The initial table further includes D modulation scheme sets, and each of the D modulation scheme sets includes π/2-BPSK modulation and M-QAM modulation. A, B, and D are integers, 0≤A≤K, 0≤B≤K, and 0<D≤B.

In a possible implementation, the initial table includes at least K modulation scheme sets, and the K modulation scheme sets include A modulation scheme sets and B modulation scheme sets. Each of the A modulation scheme sets includes π/2-BPSK modulation, and each of the B modulation scheme sets includes QPSK modulation. The MCS initial table further includes E modulation scheme sets, and each of the E modulation scheme sets includes M-QAM modulation. M-QAM modulation in the E modulation scheme sets may be modified to π/2-BPSK modulation, the E modulation scheme sets are modulation scheme sets that are different from the K modulation scheme sets in the initial table, where A, B, and E are integers, M is a positive integer, 0≤A≤K, 0≤B≤K, and 0<E≤B.

In a possible implementation, the method further includes: sending, by the user equipment, modulation scheme configuration information to the network device, where the modulation scheme configuration information is used to indicate information about the modulation schemes that are in the K modulation scheme sets in the target MCS table and that are determined by the user equipment. Based on this solution, after determining the modulation schemes in the K modulation scheme sets in the target MCS table, the user equipment sends the modulation scheme configuration information to the network device, so that the user equipment is related to updating of the target MCS table, and updating of the target MCS table is not only related to the network device but also related to the user equipment. Therefore, a form of the target MCS table is closer to a use scenario, so that the network device and the user equipment can more flexibly and accurately select a modulation scheme.

In a possible implementation, the method further includes: receiving, by the user equipment, modulation scheme configuration information sent by the network device, where the modulation scheme configuration information is used to indicate information about modulation schemes that are in the K modulation scheme sets in the target MCS table and that are determined by the network device; and the determining, by the user equipment, modulation schemes in the K modulation scheme sets in the target MCS table based on an initial table includes: determining, by the user equipment, the modulation schemes in the K modulation scheme sets in the target MCS table based on the modulation scheme configuration information.

In a possible implementation, the user equipment updates a modulation scheme in the K modulation scheme sets in the target MCS table. Based on this solution, the user equipment can update the modulation scheme in the target MCS table, and can flexibly perform updating depending on an application scenario, and this provides a basis for flexible selection of a modulation scheme for communication between the user equipment and the network device.

In a possible implementation, the method further includes: sending, by the user equipment, update indication information to the network device, where the update indication information is used to indicate information about the modulation scheme that is in the K modulation scheme sets in the target MCS table and that is updated by the user equipment. Based on this solution, the user equipment can instruct the network device to use the target MCS table updated by the user equipment.

In a possible implementation, the method further includes: receiving, by the user equipment, update indication information sent by the network device, where the update indication information is used to indicate information about the modulation scheme that is in the K modulation scheme sets in the target MCS table and that is to be updated by the user equipment; and the updating, by the user equipment, a modulation scheme in the K modulation scheme sets in the target MCS table includes: updating, by the user equipment, the modulation scheme in the K modulation scheme sets in the target MCS table according to the update indication information. Based on this solution, the user equipment can update the target MCS table on the user equipment side according to the update indication sent by the network device.

In a possible implementation, the method further includes: determining, by the user equipment, a value of a target parameter or a target preset correspondence, where the target parameter includes a maximum output power gain, a carrier frequency range, or a bandwidth range, and the target preset correspondence includes a preset correspondence between values of target parameters and modulation schemes in the K modulation scheme sets; and the updating, by the user equipment, a modulation scheme in the K modulation scheme sets in the target MCS table includes: updating, by the user equipment, the modulation scheme in the K modulation scheme sets in the target MCS table based on the target parameter or the target preset correspondence. Based on this solution, the user equipment can update the target MCS table on the user equipment side based on the value of the target parameter or the target preset correspondence that is determined by the user equipment.

In a possible implementation, the determining, by the user equipment, a value of a target parameter or a target preset correspondence includes: determining, by the user equipment, the value of the target parameter or the target preset correspondence based on configuration information of the target parameter, where the configuration information of the target parameter includes the maximum output power gain, the carrier frequency range, the bandwidth range, and/or a correspondence determined by the network device. Based on this solution, the user equipment can determine the value of the target parameter or the target preset correspondence.

In a possible implementation, the method further includes: sending, by the user equipment, configuration information of the target parameter to the network device, where the configuration information of the target parameter includes the maximum output power gain, the carrier frequency range, the bandwidth range, and/or a correspondence determined by the user equipment; and the updating, by the user equipment, a modulation scheme in the K modulation scheme sets in the target MCS table includes: receiving, by the user equipment, acknowledgement configuration information that is of the target parameter and that is sent by the network device, and updating, by the user equipment, the modulation scheme in the K modulation scheme sets in the target MCS table according to the acknowledgement configuration information of the target parameter. Based on this solution, the user equipment sends the configuration information to the network device, the user equipment receives the acknowledgement configuration information sent by the network device, and the user equipment can update the target MCS table according to an indication in the acknowledgement configuration information sent by the network device.

In a possible implementation, the indication information of the target MCS table is sent by the user equipment to the network device by using radio resource control RRC signaling or a media access control element (MAC CE). Based on this solution, the user equipment can send the indication information of the target MCS table.

In a possible implementation, the update indication information is sent by the user equipment to the user equipment by using the RRC or the MAC CE. Based on this solution, the update indication information can be sent.

In a possible implementation, the configuration information of the target parameter is sent by the user equipment to the network device by using the RRC or the MAC CE.

According to still another aspect, a network device is provided, where the network device includes a determining module and a communications module; the determining module is configured to determine, based on a correspondence between an index number and a modulation scheme, a modulation scheme corresponding to a target index number, where the correspondence between an index number and a modulation scheme includes that each index number is corresponding to one modulation scheme set, the modulation scheme set includes at least one modulation scheme, each of K modulation scheme sets includes $\pi/2$ binary phase shift keying $\pi/2$-BPSK modulation or quadrature phase shift keying QPSK modulation, K is an integer greater than 0; and the communications module is configured to perform communication based on the modulation scheme corresponding to the target index number.

In a possible implementation, the determining module is further configured to determine a target MCS table, where the target MCS table includes the K modulation scheme sets.

In a possible implementation, the target MCS table includes the K modulation scheme sets, in the K modulation scheme sets, each of K1 modulation scheme sets includes $\pi/2$-BPSK modulation, and each of (K-K1) modulation scheme sets includes QPSK modulation, where K1 is an integer, $0 \le K1 \le K$, and $0 \le (K-K1) \le K$. Alternatively, the target MCS table includes the K modulation scheme sets and N modulation scheme sets, each of the N modulation scheme sets includes multiple quadrature amplitude modulation M-QAM or $\pi/2$-BPSK modulation, and N and M are positive integers.

In a possible implementation, if coding schemes corresponding to the N modulation scheme sets are the same as coding schemes corresponding to the K modulation scheme sets, modulation schemes in the N modulation scheme sets are $\pi/2$-BPSK modulation, where $N \le M$.

In a possible implementation, the determining module is specifically configured to determine the target MCS table based on a type of user equipment; or determine the target MCS table based on a target transmission mode, where the target transmission mode is a frequency domain spectral shaping FDSS technology or a coverage enhancement mode; or determine the target MCS table based on a bandwidth range used by user equipment; or determine the target MCS table based on a frequency band used by user equipment.

In a possible implementation, the network device further includes a sending module, where the sending module is configured to send indication information of the target MCS table to the user equipment, where the indication information of the target MCS table is used to indicate information about the target MCS table.

In a possible implementation, the network device further includes a receiving module, where the receiving module is configured to receive indication information that is of the target MCS table and that is sent by user equipment, where the indication information of the target MCS table is used to indicate information about the target MCS table; and the determining module is specifically configured to determine the target MCS table according to the indication information of the target MCS table.

In a possible implementation, the determining module is further configured to determine modulation schemes in the K modulation scheme sets in the target MCS table based on an initial table.

In a possible implementation, the determining module is specifically configured to: if the modulation schemes included in the K modulation scheme sets in the initial table are π/2-BPSK modulation and QPSK modulation, determine that modulation schemes in K2 modulation scheme sets in the K modulation scheme sets in the target MCS table are π/2-BPSK modulation, and modulation schemes in (K−K2) modulation scheme sets in the K modulation scheme sets are QPSK modulation, where K2 is an integer, and 0≤K2≤K; or if initial modulation schemes in the K modulation scheme sets in the initial table are QPSK modulation, determine that modulation schemes in K2 modulation scheme sets in the K modulation scheme sets in the target MCS table are π/2-BPSK modulation, where 0≤K2≤K.

In a possible implementation, the K modulation scheme sets in the initial table include A modulation scheme sets, B modulation scheme sets, and C modulation scheme sets. Each of the A modulation scheme sets includes only π/2-BPSK modulation, each of the B modulation scheme sets includes only QPSK modulation, each of the C modulation scheme sets includes π/2-BPSK modulation and QPSK modulation, A, B, and C are integers, 0≤A≤K, 0≤B≤K, and 0≤C≤K. Alternatively, the K modulation scheme sets in the initial table include A modulation scheme sets and B modulation scheme sets. Each of the A modulation scheme sets includes only π/2-BPSK modulation, and each of the B modulation scheme sets includes only QPSK modulation. The initial table further includes D modulation scheme sets, and each of the D modulation scheme sets includes π/2-BPSK modulation and M-QAM modulation. A, B, and D are integers, 0≤A≤K, 0≤B≤K, and 0<D≤B.

In a possible implementation, the initial table includes at least K modulation scheme sets, and the K modulation scheme sets include A modulation scheme sets and B modulation scheme sets. Each of the A modulation scheme sets includes π/2-BPSK modulation, and each of the B modulation scheme sets includes QPSK modulation. The MCS initial table further includes E modulation scheme sets, and each of the E modulation scheme sets includes M-QAM modulation. M-QAM modulation in the E modulation scheme sets may be modified to π/2-BPSK modulation, the E modulation scheme sets are modulation scheme sets that are different from the K modulation scheme sets in the initial table, where A, B, and E are integers, M is a positive integer, 0≤A≤K, 0≤B≤K, and 0<E≤B.

In a possible implementation, the sending module is further configured to send modulation scheme configuration information to the user equipment, where the modulation scheme configuration information is used to indicate information about the modulation schemes that are in the K modulation scheme sets in the target MCS table and that are determined by the network device.

In a possible implementation, the receiving module is further configured to receive modulation scheme configuration information sent by the user equipment, where the modulation scheme configuration information is used to indicate information about modulation schemes that are in the K modulation scheme sets in the target MCS table and that are determined by the user equipment; and the determining module is further configured to: determine the modulation schemes in the K modulation scheme sets in the target MCS table based on the modulation scheme configuration information.

In a possible implementation, the network device further includes an update module, and the update module is configured to update a modulation scheme in the K modulation scheme sets in the target MCS table.

In a possible implementation, the sending module is further configured to send update indication information to the user equipment, where the update indication information is used to indicate information about the modulation scheme that is in the K modulation scheme sets in the target MCS table and that is updated by the network device.

In a possible implementation, the receiving module is further configured to receive update indication information sent by the user equipment, where the update indication information is used to indicate information about the modulation scheme that is in the K modulation scheme sets in the target MCS table and that is to be updated by the network device; and the update module is further configured to: update the modulation scheme in the K modulation scheme sets in the target MCS table according to the update indication information.

In a possible implementation, the determining module is further configured to determine a value of a target parameter or a target preset correspondence, where the target parameter includes a maximum output power gain, a carrier frequency range, or a bandwidth range, and the target preset correspondence includes a preset correspondence between values of target parameters and modulation schemes in the K modulation scheme sets; and the update module is specifically configured to: update the modulation scheme in the K modulation scheme sets in the target MCS table based on the target parameter or the target preset correspondence.

In a possible implementation, the determining module is specifically configured to determine the value of the target parameter or the target preset correspondence based on configuration information of the target parameter, where the configuration information of the target parameter includes the maximum output power gain, the carrier frequency range, the bandwidth range, and/or a correspondence determined by the user equipment.

In a possible implementation, the receiving module is further configured to receive configuration information that is of the target parameter and that is sent by the user equipment, where the configuration information of the target parameter includes the maximum data power gain, the carrier frequency range, the bandwidth range, and/or a correspondence determined by the user equipment; and the sending module is further configured to send acknowledgement configuration information of the target parameter to the user equipment.

In a possible implementation, the determining module is specifically configured to specify an MCS table as the target MCS table; or receive a first MCS table sent by the user equipment, where the first MCS table is a target MCS table determined by the user equipment; and determine the target MCS table based on the first MCS table.

In a possible implementation, the indication information of the target MCS table is sent by the network device to the user equipment by using downlink control information DCI, radio resource control RRC signaling, or a media access control control element MAC CE.

In a possible implementation, the update indication information is sent by the network device to the user equipment by using the DCI, the RRC, or the MAC CE.

In a possible implementation, the configuration information of the target parameter is sent by the network device to the user equipment by using the DCI, the RRC, or the MAC CE.

According to still another aspect, user equipment is provided, where the user equipment includes a determining module and a communications module; the determining module is configured to determine, based on a correspondence between an index number and a modulation scheme, a modulation scheme corresponding to a target index number, where the correspondence between an index number and a modulation scheme includes that each index number is corresponding to one modulation scheme set, the modulation scheme set includes at least one modulation scheme, each of K modulation scheme sets includes $\pi/2$ binary phase shift keying $\pi/2$-BPSK modulation or quadrature phase shift keying QPSK modulation, K is an integer greater than 0; and the communications module is configured to perform communication based on the modulation scheme corresponding to the target index number.

In a possible implementation, the determining module is further configured to: before determining the modulation scheme corresponding to the target index number based on the correspondence between an index number and a modulation scheme, determine a target MCS table, where the target MCS table includes the K modulation scheme sets.

In a possible implementation, the target MCS table includes the K modulation scheme sets, in the K modulation scheme sets, each of K1 modulation scheme sets includes $\pi/2$-BPSK modulation, and each of (K−K1) modulation scheme sets includes QPSK modulation, where K1 is an integer, $0 \leq K1 \leq K$, and $0 \leq (K-K1) \leq K$. Alternatively, the target MCS table includes the K modulation scheme sets and N modulation scheme sets, each of the N modulation scheme sets includes multiple quadrature amplitude modulation M-QAM or $\pi/2$-BPSK modulation, and N and M are integers.

In a possible implementation, if coding schemes corresponding to the N modulation scheme sets are the same as coding schemes corresponding to the K modulation scheme sets, modulation schemes in the N modulation scheme sets are $\pi/2$-BPSK modulation, where $N \leq M$.

In a possible implementation, the determining module is specifically configured to determine the target MCS table based on a type of the user equipment; or determine the target MCS table based on a target transmission mode, where the target transmission mode is a frequency domain spectral shaping FDSS technology or a coverage enhancement mode; or determine the target MCS table based on a bandwidth range used by the user equipment; or determine the target MCS table based on a frequency band used by the user equipment.

In a possible implementation, the user equipment further includes a sending module, where the sending module is configured to send indication information of the target MCS table to the network device, where the indication information of the target MCS table is used to indicate information about the target MCS table.

In a possible implementation, the user equipment further includes a receiving module, where the receiving module is configured to receive indication information that is of the target MCS table and that is sent by the network device, where the indication information of the target MCS table is used to indicate information about the target MCS table; and the determining module is further configured to determine the target MCS table according to the indication information of the target MCS table.

In a possible implementation, the sending module is further configured to send a first MCS table to the network device, where the first MCS table is the target MCS table determined by the user equipment.

In a possible implementation, the determining module is further configured to determine modulation schemes in the K modulation scheme sets in the target MCS table based on an initial table.

In a possible implementation, the determining module is specifically configured to: if the modulation schemes included in the K modulation scheme sets in the initial table are $\pi/2$-BPSK modulation and QPSK modulation, determine that modulation schemes in K2 modulation scheme sets in the K modulation scheme sets in the target MCS table are $\pi/2$-BPSK modulation, and modulation schemes in (K−K2) modulation scheme sets in the K modulation scheme sets are QPSK modulation, where K2 is an integer, and $0<K2<K$; or if initial modulation schemes in the K modulation scheme sets in the initial table are QPSK modulation, determine that modulation schemes in K2 modulation scheme sets in the K modulation scheme sets in the target MCS table are $\pi/2$-BPSK modulation, where $0 \leq K2 \leq K$.

In a possible implementation, the K modulation scheme sets in the initial table include A modulation scheme sets, B modulation scheme sets, and C modulation scheme sets. Each of the A modulation scheme sets includes only $\pi/2$-BPSK modulation, each of the B modulation scheme sets includes only QPSK modulation, each of the C modulation scheme sets includes $\pi/2$-BPSK modulation and QPSK modulation, A, B, and C are integers, $0 \leq A \leq K$, $0 \leq B \leq K$, and $0 \leq C \leq K$. Alternatively, the K modulation scheme sets in the initial table include A modulation scheme sets and B modulation scheme sets. Each of the A modulation scheme sets includes only $\pi/2$-BPSK modulation, and each of the B modulation scheme sets includes only QPSK modulation. The initial table further includes D modulation scheme sets, and each of the D modulation scheme sets includes $\pi/2$-BPSK modulation and M-QAM modulation. A, B, and D are integers, $0 \leq A \leq K$ $0 \leq B \leq K$, and $0<D \leq B$.

In a possible implementation, the initial table includes at least K modulation scheme sets, and the K modulation scheme sets include A modulation scheme sets and B modulation scheme sets. Each of the A modulation scheme sets includes $\pi/2$-BPSK modulation, and each of the B modulation scheme sets includes QPSK modulation. The MCS initial table further includes E modulation scheme sets, and each of the E modulation scheme sets includes M-QAM modulation. M-QAM modulation in the E modulation scheme sets may be modified to $\pi/2$-BPSK modulation, the E modulation scheme sets are modulation scheme sets that are different from the K modulation scheme sets in the initial table, where A, B, and E are integers, M is a positive integer, $0 \leq A \leq K$, $0 \leq B \leq K$, and $0<E \leq B$.

In a possible implementation, the sending module is further configured to send modulation scheme configuration information to the network device, where the modulation scheme configuration information is used to indicate information about the modulation schemes that are in the K modulation scheme sets in the target MCS table and that are determined by the user equipment.

In a possible implementation, the receiving module is further configured to receive modulation scheme configuration information sent by the network device, where the modulation scheme configuration information is used to indicate information about modulation schemes that are in the K modulation scheme sets in the target MCS table and that are determined by the network device; and the determining module is further configured to: determine the modulation schemes in the K modulation scheme sets in the target MCS table based on the modulation scheme configuration information.

In a possible implementation, the user equipment further includes an update module, and the update module is configured to update a modulation scheme in the K modulation scheme sets in the target MCS table.

In a possible implementation, the sending module is further configured to send update indication information to the network device, where the update indication information is used to indicate information about the modulation scheme that is in the K modulation scheme sets in the target MCS table and that is updated by the user equipment.

In a possible implementation, the receiving module is further configured to receive update indication information sent by the network device, where the update indication information is used to indicate information about the modulation scheme that is in the K modulation scheme sets in the target MCS table and that is to be updated by the user equipment; and the update module is specifically configured to: update the modulation scheme in the K modulation scheme sets in the target MCS table according to the update indication information.

In a possible implementation, the determining module is further configured to determine a value of a target parameter or a target preset correspondence, where the target parameter includes a maximum output power gain, a carrier frequency range, or a bandwidth range, and the target preset correspondence includes a preset correspondence between values of target parameters and modulation schemes in the K modulation scheme sets; and the update module is specifically configured to: update the modulation scheme in the K modulation scheme sets in the target MCS table based on the target parameter or the target preset correspondence.

In a possible implementation, the determining module is specifically configured to determine the value of the target parameter or the target preset correspondence based on configuration information of the target parameter, where the configuration information of the target parameter includes the maximum output power gain, the carrier frequency range, the bandwidth range, and/or a correspondence determined by the network device.

In a possible implementation, the sending module is further configured to send configuration information of the target parameter to the network device, where the configuration information of the target parameter includes the maximum output power gain, the carrier frequency range, the bandwidth range, and/or a correspondence determined by the user equipment; and the update module is specifically configured to receive acknowledgement configuration information that is of the target parameter and that is sent by the network device, and update the modulation scheme in the K modulation scheme sets in the target MCS table according to the acknowledgement configuration information of the target parameter.

In a possible implementation, the indication information of the target MCS table is sent by the user equipment to the network device by using radio resource control RRC signaling or a media access control element MAC CE.

In a possible implementation, the update indication information is sent by the user equipment to the network device by using the RRC or the MAC CE.

In a possible implementation, the configuration information of the target parameter is sent by the user equipment to the network device by using DCI, the RRC, or the MAC CE.

According to still another aspect, a network device is provided, including a processor, a memory, and a communications interface, where the memory is configured to store a computer executable instruction. When the network device runs, the processor executes the computer executable instruction stored in the memory, so that the network device performs the communication methods in the foregoing aspects.

According to still another aspect, user equipment is provided, including a processor, a memory, and a communications interface, where the memory is configured to store a computer executable instruction. When the user equipment runs, the processor executes the computer executable instruction stored in the memory, so that the user equipment performs the communication methods in the foregoing aspects.

According to still another aspect, a network device is provided. The network device may be the network device in the foregoing method design, or may be a chip disposed in the network device. The network device includes: a memory configured to store computer executable program code, a communications interface, and a processor. The processor is coupled to the memory and the communications interface. The program code stored in the memory includes an instruction. When the processor executes the instruction, the network device performs the communication method performed by the network device in any one of the foregoing possible designs.

According to still another aspect, user equipment is provided, where the user equipment may be the user equipment in the foregoing method design, or may be a chip disposed in the user equipment. The user equipment includes: a memory configured to store computer executable program code, a communications interface, and a processor. The processor is coupled to the memory and the communications interface. The program code stored in the memory includes an instruction. When the processor executes the instruction, the user equipment performs the communication method performed by the user equipment in any one of the foregoing possible designs.

According to still another aspect, an embodiment of this application provides a computer-readable storage medium, where the computer-readable storage medium stores an instruction, and when the instruction runs on a computer, the computer performs the communication methods in the foregoing aspects.

According to still another aspect, an embodiment of this application provides a computer program product including an instruction, and when the instruction runs on a computer, the computer performs the communication methods in the foregoing aspects.

In addition, for technical effects brought by any design manner in the foregoing device embodiments, refer to technical effects brought by different design manners in the communication method embodiments in the foregoing aspects. Details are not described herein again.

These aspects or other aspects of this application are clearer and more comprehensible in descriptions of the following embodiments.

DESCRIPTION OF EMBODIMENTS

Figure 1:
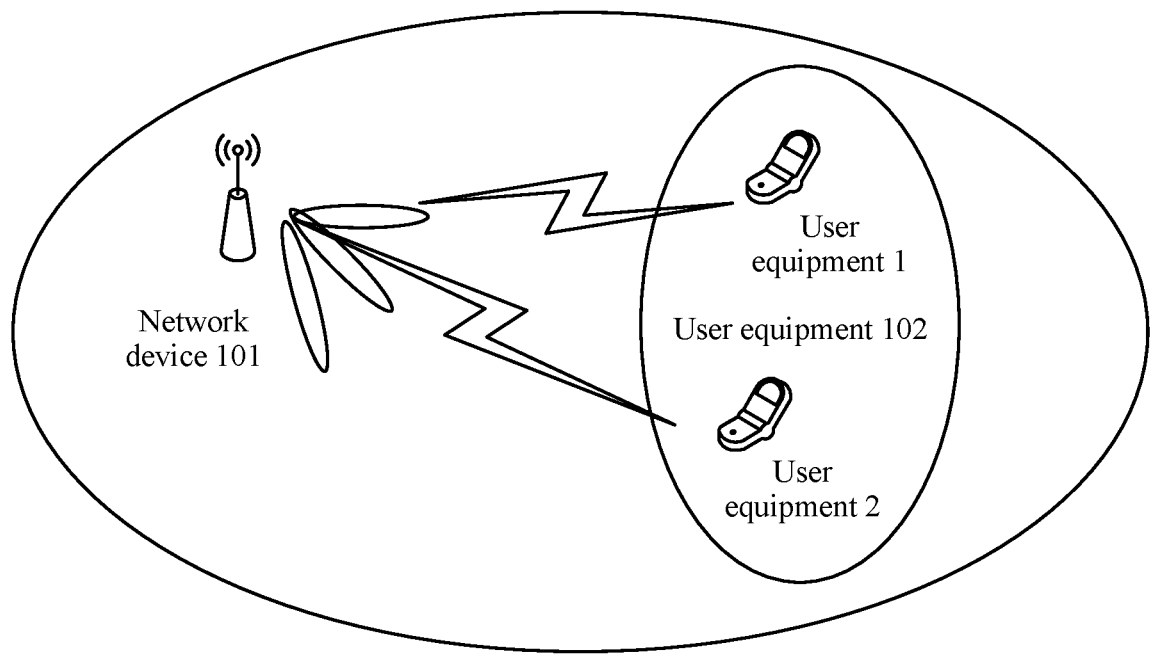
FIG. 1 is a communications architecture diagram according to an embodiment of this application.

First, to facilitate understanding of the solutions of this application, the following provides concepts related to this application.

1. MCS Table

A modulation and coding scheme table is a representation form proposed to represent a communication rate. A concerned factor that affects the communication rate may be used as a column of the table, and an MCS index is used as a row, so as to form a rate table. A correspondence between an MCS index number and a modulation scheme may be represented by using an MCS table. The MCS table provides a set of modulation and coding schemes. To accurately represent the modulation and coding scheme, the MCS table includes an MCS index number, a modulation scheme, and a coding scheme. Optionally, the MCS table may further include other content. The MCS index number is used to number the MCS. The modulation scheme may be described by using a modulation order or a modulation name. For example, the modulation order is 1, 2, or 4, and the modulation name is QPSK, quadrature amplitude modulation (QAM), or BPSK. The coding scheme may be indicated by using a transmission block size (TBS), may be indicated by using a code rate, or may be indicated by using a bit quantity per resource element (RE) (namely, spectral efficiency). The code rate is coding efficiency, and the code rate=quantity of transmitted data bits/(quantity of transmitted data bits+ quantity of redundant data bits). Other content may be used to describe information such as a redundancy version of channel coding.

2. 802.11ad MCS Table

Table 1 is an 802.11ad MCS table. The 802.11ad MCS table includes an MCS index (MCS index), a modulation scheme (modulation scheme), a modulation order ($N_{CBPS}$), a repetition (repetition), a code rate (CR), and a data rate (data rate).

The data rate is measured in Mbps.

TABLE 1

| MCS index | Modulation scheme | $N_{CBPS}$ | Repetition | Code rate | Data rate |
|---|---|---|---|---|---|
| 1 | π/2-BPSK | 1 | 2 | 1/2 | 385 |
| 2 | π/2-BPSK | 1 | 1 | 1/2 | 770 |
| 3 | π/2-BPSK | 1 | 1 | 5/8 | 962.5 |
| 4 | π/2-BPSK | 1 | 1 | 3/4 | 1155 |
| 5 | π/2-BPSK | 1 | 1 | 13/16 | 1251.25 |
| 6 | π/2-QPSK | 2 | 1 | 1/2 | 1540 |
| 7 | π/2-QPSK | 2 | 1 | 5/8 | 1925 |
| 8 | π/2-QPSK | 2 | 1 | 3/4 | 2310 |
| 9 | π/2-QPSK | 2 | 1 | 13/16 | 2502.5 |
| 10 | π/2-16QAM | 4 | 1 | 1/2 | 3080 |
| 11 | π/2-16QAM | 4 | 1 | 5/8 | 3850 |
| 12 | π/2-16QAM | 4 | 1 | 3/4 | 4620 |
| ... | ... | ... | ... | ... | ... |

3. NB-IoT MCS Table

Table 2 is an NB-IoT MCS table. The NB-IoT MCS table includes an MCS index ($I_{MCS}$), a modulation order ($Q_m$), and a TBS index ($I_{TBS}$).

TABLE 2

| $I_{MCS}$ | $Q_m$ | $I_{TBS}$ |
|---|---|---|
| 0 | 1 | 0 |
| 1 | 1 | 2 |
| 2 | 2 | 1 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| ... | ... | ... |

4. Use of the MCS Table

After a form of the MCS table is determined, one uplink transmission process, that is, S1 to S4, is used as an example to describe how to use the MCS table.

S1. Perform initialization and determine an MCS table used by a network device and user equipment.

S2. The network device sends scheduling information to the user equipment based on a status of the user equipment, and performs uplink scheduling on the user equipment. The status of the user equipment includes a power headroom, a buffer (buffer) status, a channel condition, and/or the like. The scheduling information includes information such as an MCS index number, a location of a resource block (RB) allocated to the user equipment, a bandwidth, a start location of a time domain symbol, an end location of the time domain symbol, and a power control indication.

S3. The user equipment receives and parses the scheduling information, and determines information such as an allocated MCS index and bandwidth. The user equipment may determine an allocated TBS and modulation scheme based on the MCS index number. The user equipment first performs operations such as channel coding and rate matching; then, performs modulation according to modulation scheme information; further performs an operation such as resource mapping based on the RB location, the bandwidth, and the like; and finally, generates a signal for sending.

S4. After receiving the signal from the user equipment, the network device performs operations such as demodulation and decoding on the signal based on a message such as the foregoing MCS table and bandwidth, and then feeds back ACK/NACK information to the user equipment.

The following describes the technical solutions in the embodiments of this application with reference to the accompanying drawings in the embodiments of this application.

It should be noted that, the character "/" in this specification represents the meaning of "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. "A plurality of" refers to two or more than two.

It should be noted that, in the embodiments of this application, the word "example", "for example", or the like is used to represent giving an example, an illustration, or a description. Any embodiment or design scheme described as an "example" or "for example" in the embodiments of this application should not be interpreted as being more preferred or having more advantages than another embodiment or design scheme. Exactly, the word "example", "for example", or the like is used to present a related concept in a specific manner.

It should be noted that in the embodiments of this application, "of (of)", "corresponding (corresponding, relevant)", and "corresponding (corresponding)" can be interchangeably used sometimes. It should be noted that, consistent meanings are expressed when differences are not emphasized.

FIG. 1 is a communications architecture diagram according to an embodiment of this application. As shown in FIG. 1, the communications architecture includes a network device 101 and at least one user equipment 102. For example, the user equipment 102 may be user equipment 1 and user equipment 2. The network device 101 is configured to allocate an MCS table to the user equipment 102, and the user equipment 102 is configured to choose the MCS table allocated by the network device 101 to communicate with the network device.

Figure 2:
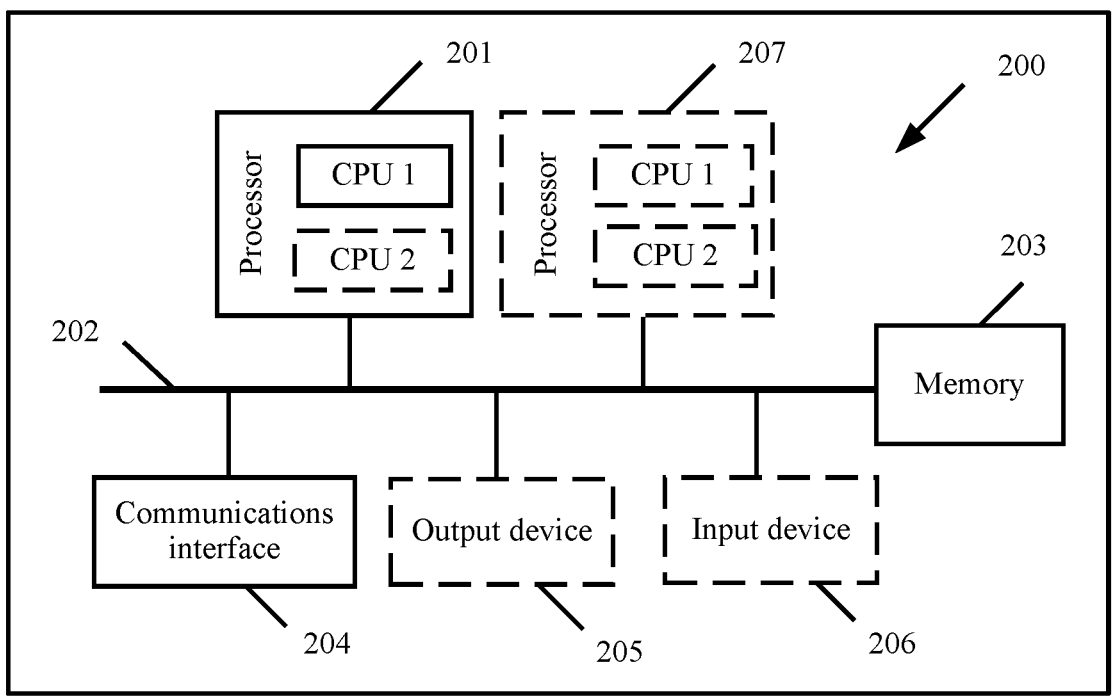
FIG. 2 is a schematic diagram of a computer device according to an embodiment of this application.

As shown in FIG. 2, both the network device and the user equipment in this embodiment of this application may be implemented by using a computer device (or a system) in FIG. 2.

FIG. 2 is a schematic diagram of a computer device according to an embodiment of this application. A computer device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits configured to control program execution of the solution in this application.

The communications bus 202 may include a channel for transmitting information between the foregoing components.

The communications interface 204 uses any apparatus such as a transceiver to communicate with another device or a communications network, such as Ethernet, a radio access network (RAN), or a wireless local area network (WLAN).

The memory 203 may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that is accessible to a computer, but is not limited thereto. The memory may exist independently, and is connected to the processor by using the bus. Alternatively, the memory may be integrated with the processor.

The memory 203 is configured to store application program code for executing the solutions in this application, and the processor 201 controls the execution. The processor 201 is configured to execute the application program code stored in the memory 203, so as to implement a communication method in the embodiments of this application.

During specific implementation, in an embodiment, the processor 201 may include one or more CPUs, for example, a CPU 0 and a CPU 1 in FIG. 2.

During specific implementation, in an embodiment, the computer device 200 may include a plurality of processors, such as the processor 201 and a processor 207 in FIG. 2. Each of the processors may be a single-core (single-CPU) processor, or may be a multi-core (multi-CPU) processor. Herein, the processor may be one or more devices, a circuit, and/or a processing core configured to process data (such as a computer program instruction).

During specific implementation, in an embodiment, the computer device 200 may further include an output device 205 and an input device 206. The output device 205 communicates with the processor 201, and can display information in a plurality of manners. For example, the output device 205 may be a liquid crystal display (LCD), a light emitting diode (LED) display device, a cathode ray tube (CRT) display device, or a projector (projector). The input device 206 communicates with the processor 201, and can receive a user input in a plurality of manners. For example, the input device 206 may be a mouse, a keyboard, a touchscreen device, or a sensing device.

The computer device 200 may be a general-purpose computer device or a dedicated computer device. During specific implementation, the computer device 200 may be a desktop computer, a portable computer, a network server, a personal digital assistant (PDA), a mobile phone, a tablet computer, a wireless terminal device, a communications device, an embedded device, or a device having a structure similar to that in FIG. 2. A type of the computer device 200 is not limited in this embodiment of this application.

For ease of description, the following describes a selection principle between π/2-BPSK modulation and QPSK modulation in the embodiments of this application.

In a case of a same coding scheme, to ensure a higher transmission rate, the user equipment may select a modulation and coding scheme with a relatively low block error rate (BLER). Because a code rate for π/2-BPSK modulation is twice a code rate for QPSK modulation, theoretical performance of QPSK modulation is better than that of π/2-BPSK modulation under a same signal-to-noise ratio condition.

For example, Table 3 shows performance differences in a case in which π/2-BPSK modulation and QPSK modulation provided in this embodiment of this application have a same coding scheme. Table 3 includes a TBS index (TBS index), a code rate for QPSK (CR for QPSK), a code rate for π/2-BPSK (CR for π/2-BPSK), and a performance loss (performance loss). The TBS index represents a coding scheme. The performance loss in Table 3 refers to a performance loss of π/2-BPSK modulation relative to QPSK modulation on a white Gaussian noise channel at a same code rate. Column 4 of Table 3 includes a theoretical performance loss and a simulated performance loss, where a value in parentheses is a theoretical performance loss, a value outside the parentheses is a simulated performance loss, and the performance loss is measured in dB. Because an LTE turbo code has no coding gain when a code rate is less than ⅓, in a case of a low code rate, a simulated performance loss is 0.

TABLE 3

| TBS index | CR for QPSK | CR for π/2-BPSK | Performance loss |
|---|---|---|---|
| 0 | 0.1172 | 0.2344 | 0 (0.4) |
| 1 | 0.1528 | 0.3056 | 0 (0.5) |
| 2 | 0.1885 | 0.3770 | 0.3 (0.7) |
| 3 | 0.2446 | 0.4892 | 0.8 (0.9) |
| 4 | 0.3008 | 0.6016 | 1.3 (1.3) |
| 5 | 0.3696 | 0.7392 | 1.9 (1.9) |
| 6 | 0.4385 | 0.8770 | 3.4 (3) |
| 7 | 0.5132 | — | — |
| ... | ... | ... | ... |

It is assumed that π/2-BPSK modulation and QPSK modulation have a same signal-to-noise ratio on a receive end, that is, the two modulation schemes have the same signal-to-noise ratio. As described in Table 3, when the TBS index is 0 and the TBS index is 1, performance of the two modulation schemes is the same, and the code rate for π/2-BPSK modulation is higher. Therefore, π/2-BPSK modulation is preferred. When the TBS index is greater than 3, the QPSK modulation has better performance. Therefore, when an MCS table is being configured, modulation schemes corresponding to TBS indexes 0 and 1 are π/2-BPSK modulation, and modulation schemes corresponding to other TBS indexes are QPSK. However, in an actual application, π/2-BPSK modulation has a relatively large transmit power, that is, a π/2-BPSK modulation signal has a relatively high signal-to-noise ratio on a receive end. With reference to Table 3, it is assumed that using π/2-BPSK modulation has a transmit power advantage of 1 dB over using QPSK modulation, better performance can be obtained by using π/2-BPSK modulation when TBS indexes are 0-3, and better performance can be obtained by using QPSK modulation when the index number is greater than 3.

It should be noted that the TBS represents a quantity of information bits in one transport block before channel coding. In conventional LTE, a TBS value may be determined through table lookup based on the TBS index and bandwidth information in the MCS table. In this embodiment of this application, the TBS value may be determined based on the TBS index and a scheduling resource in NR. NR supports a plurality of slot (slot) lengths. In time domain, NR can support a slot of a specified length in LTE, and can also support a short slot of any length. In this case, the TBS value may be calculated by using the TBS index and a quantity of scheduling resource elements (RE). For example, the slot may be a slot occupying one symbol, two symbols, seven symbols, or 14 symbols in time domain. In LTE, one RB occupies a length of seven symbols in time domain, namely, 0.5 frame (duration is 0.5 ms), and one resource block pair (RB pair) occupies a length of 14 symbols in time domain, namely, one frame (duration is 1 ms). In NR, it is not limited to use of an RB pair-based transmission resource, and a resource of any slot length may be selected for transmission.

Before the communication method in the embodiments of this application is described, a configuration manner of an initial table of an MCS table in the network device and the user equipment in the embodiments of this application is first provided. The network device and the user equipment may communicate with each other based on the initial table, or may obtain a proper MCS table based on the initial table.

For ease of description, for example, the modulation scheme in the embodiments of this application is represented by using a modulation order.

A modulation order 1 indicates that the modulation scheme is π/2-BPSK modulation, a modulation order 2 indicates that the modulation scheme is QPSK, a modulation order 4 indicates that the modulation scheme is π/2-16QAM modulation, a modulation order 6 indicates that the modulation scheme is 64-QAM modulation, and a modulation order 8 indicates that the modulation scheme is 256-QAM modulation. Certainly, in the embodiments of this application, the modulation scheme may be alternatively represented in another form. No specific limitation is imposed on a representation form of the coding scheme in the MCS table in the embodiments of this application.

Configuration Manner 1:

The MCS initial table includes at least K modulation scheme sets, where the K modulation scheme sets include A modulation scheme sets, B modulation scheme sets, and C modulation scheme sets, each of the A modulation scheme sets includes only π/2-BPSK modulation, each of the B modulation scheme sets includes only QPSK modulation, each of the C modulation scheme sets includes π/2-BPSK modulation and QPSK modulation, A, B, and C are integers, 0≤A≤K, 0≤B≤K, and 0≤C≤K. The MCS initial table may alternatively include another modulation scheme set.

For ease of understanding, in the embodiments of this application, the modulation scheme is represented by using a modulation order, and a coding scheme is represented by using a TBS index. For example, modulation scheme sets corresponding to MCS index numbers 0 to 5 in the MCS table include π/2-BPSK or QPSK, that is, modulation schemes in the six modulation scheme sets may be modified.

For example, Table 4 is an example table of configuration manner 1, and it is assumed that K=6, A=2, B=1, and C=3. MCS index numbers corresponding to the A modulation scheme sets are 0 and 1, MCS index numbers corresponding to the C modulation scheme sets are 2 to 4, and an MCS index number corresponding to the B modulation scheme set is 5.

TABLE 4

| MCS index | Modulation order | TBS index |
|---|---|---|
| 0 | 1 | 0 |
| 1 | 1 | 1 |
| 2 | 1/2 | 2 |
| 3 | 1/2 | 3 |
| 4 | 1/2 | 4 |
| 5 | 2 | 5 |
| ... | ... | ... |
| 18 | 4 | 17 |
| ... | ... | ... |
| 23 | 6 | 21 |
| ... | ... | ... |
| 29 | 8 | 26 |
| ... | ... | ... |

It should be noted that, on one hand, the table in the foregoing form cannot be directly used, and before the table is used, which of π/2-BPSK modulation and QPSK modulation is included in the C modulation scheme sets needs to be determined depending on a requirement. On the other hand, when the coding scheme is represented by using the TBS index, the TBS index in the embodiments of this application is not incremented according to an MCS index number, and the TBS indexes are not consecutive index numbers. This is not specifically limited in the embodiments of this application. For example, Table 4a is another MCS table. Table 4a includes several pieces of information such as an MCS index, a modulation order, a code rate, and spectral efficiency, where the code rate in Table 4a is represented in a form of a target code rate*1024. A modulation order of a modulation scheme set including π/2-BPSK and QPSK may be represented by using one parameter, a value of the parameter may be configured to be different values, and different values respectively represent different modulation schemes. For example, in Table 4a, q may be used to represent the modulation order of the modulation scheme set including π/2-BPSK and QPSK. q is configured to be 1 or 2, where 1 is corresponding to π/2-BPSK modulation, and 2 is corresponding to QPSK modulation. The target code rate that is present when q is 2 is half of the target code rate that is present when q is 1. In Table 4a, modulation orders corresponding to MCS indexes 0 and 1 are q.

Both the network device and the user equipment may determine a value of q based on whether the user equipment supports π/2-BPSK. For example, when the user equipment supports π/2-BPSK modulation, the network device and the user equipment may determine that q is 1. That is, if the user equipment supports π/2-BPSK modulation, the network device and the user equipment may determine that q is 1. When the user equipment does not support π/2-BPSK, the network device and the user equipment may determine that q is 2. That is, if the user equipment supports π/2-BPSK modulation and reports, to the network device, that the modulation scheme is pπ/2 BPSK. Otherwise, the modulation scheme is QPSK. Alternatively, if the user equipment does not support π/2-BPSK, or the user equipment does not report whether the user equipment supports π/2-BPSK, the modulation scheme is QPSK.

If the network device determines that the user equipment supports π/2-BPSK modulation, the network device determines that a modulation scheme corresponding to a target index number is π/2-BPSK modulation. For example, the network device determines that modulation orders corresponding to MCS indexes 0 and 1 are π/2-BPSK modulation. Alternatively, if the network device determines that the user equipment does not support π/2-BPSK modulation, the network device determines that a modulation scheme corresponding to a target index number is QPSK modulation. For example, the network device determines that modulation orders corresponding to MCS indexes 0 and 1 are QPSK modulation. The network device may determine, by using capability information of the user equipment reported by the user equipment, whether the user equipment supports π/2-BPSK modulation. The capability information of the user equipment includes information about whether the user equipment supports π/2-BPSK modulation.

The user equipment reports the capability information of the user equipment to the network device. If the user equipment supports π/2-BPSK modulation, the user equipment determines that the modulation scheme corresponding to the target index number is π/2-BPSK modulation. For example, the user equipment determines that the modulation orders corresponding to MCS indexes 0 and 1 are π/2-BPSK modulation. Alternatively, if the user equipment does not support π/2-BPSK modulation, the user equipment determines that the modulation scheme corresponding to the target index number is QPSK modulation. For example, the user equipment determines that the modulation orders corresponding to MCS indexes 0 and 1 are QPSK modulation.

If the network device does not obtain the information about whether the user equipment supports π/2-BPSK modulation, the network device and the user equipment determine that the modulation scheme corresponding to the target index number is a preset modulation scheme, where the preset modulation scheme is π/2-BPSK modulation or QPSK modulation. Alternatively, if the user equipment does not report the capability information of the user equipment to the network device, the network device and the user equipment determine that the modulation scheme corresponding to the target index number is a preset modulation scheme, where the preset modulation scheme is π/2-BPSK modulation or QPSK modulation.

If the network device does not obtain the information about whether the user equipment supports π/2-BPSK modulation, or for example, in an initial access phase, if the user equipment has not reported the information to the network device, the network device and the user equipment may determine, by using a pre-agreed rule, a modulation order and a code rate that are corresponding to the MCS index, that is, agree that the modulation order corresponding to the MCS index is one of modulation schemes included in the modulation scheme set. For example, it is assumed that Table 4a is an uplink MCS table. In uplink transmission of a message 3 in a random access process, it may be agreed that modulation orders corresponding to both MCS indexes 0 and 1 in Table 4a are 2, that is, q=2. This method is specific to a scenario that QPSK modulation is a mandatory feature of the user equipment, and pi/2 BPSK modulation is an optional feature of the user equipment.

TABLE 4a

| MCS index | Modulation order | Target code rate * 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| ... | ... | ... | ... |

Optionally, when C=0, a modulation scheme including π/2-BPSK modulation and QPSK modulation does not exist in the MCS table. That is, the A modulation scheme sets and the B modulation scheme sets form the K modulation scheme sets.

For example, Table 5 is an example table of configuration manner 1, and it is assumed that A=3, B=3, and C=0. MCS index numbers corresponding to the A modulation scheme sets include 0-2, and MCS index numbers corresponding to the B modulation scheme sets include 3-5.

TABLE 5

| MCS index | Modulation order | TBS index |
|---|---|---|
| 0 | 1 | 0 |
| 1 | 1 | 1 |

TABLE 5-continued

| MCS index | Modulation order | TBS index |
|---|---|---|
| 2 | 1 | 2 |
| 3 | 2 | 3 |
| 4 | 2 | 4 |
| 5 | 2 | 5 |
| ... | ... | ... |
| 18 | 4 | 17 |
| ... | ... | ... |
| 23 | 6 | 21 |
| ... | ... | ... |
| 29 | 8 | 26 |
| ... | ... | ... |

Optionally, when A=0 and C=0, the K modulation scheme sets include only QPSK modulation.

For example, Table 6 is an example table of the initial table configuration manner 1, and MCS index numbers corresponding to the B modulation scheme sets include 0-5.

TABLE 6

| MCS index | Modulation order | TBS index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| ... | ... | ... |
| 18 | 4 | 17 |
| ... | ... | ... |
| 23 | 6 | 21 |
| ... | ... | ... |
| 29 | 8 | 25 |
| 30 | 8 | 26 |
| ... | ... | ... |

It should be noted that, when the initial table is a table in a form of Table 6, the initial table may also be directly applicable to an existing communications system in which an OFDM waveform is used.

Configuration Manner 2:

The MCS initial table includes at least K modulation scheme sets, where the K modulation scheme sets include A modulation scheme sets and B modulation scheme sets. Each of the A modulation scheme sets includes only π/2-BPSK modulation, and each of the B modulation scheme sets includes only QPSK modulation. The MCS initial table further includes D modulation scheme sets. Each of the D modulation scheme sets includes π/2-BPSK modulation and multiple quadrature amplitude modulation (M-QAM), and the D modulation scheme sets are modulation scheme sets that are different from the K modulation scheme sets in the initial table. A, B, and D are integers, M is a positive integer, 0≤A≤K, 0≤B≤K, and 0<D≤B. The MCS initial table may alternatively include another modulation scheme set.

For example, Table 7 is an example table of the initial configuration manner 2. It is assumed that A=3, B=3, and D=2, MCS index numbers corresponding to the A modulation scheme sets include 0-2, MCS index numbers corresponding to the B modulation scheme sets include 3-5, and MCS index numbers corresponding to the D modulation scheme sets include 29 and 30, where M-QAM modulation is 256-QAM modulation.

TABLE 7

| MCS index | Modulation order | TBS index |
|---|---|---|
| 0 | 1 | 0 |
| 1 | 1 | 1 |
| 2 | 1 | 2 |
| 3 | 2 | 3 |
| 4 | 2 | 4 |
| 5 | 2 | 5 |
| ... | ... | ... |
| 18 | 4 | 17 |
| ... | ... | ... |
| 23 | 6 | 21 |
| ... | ... | ... |
| 29 | 8/1 | 25/3 |
| 30 | 8/1 | 26/4 |
| ... | ... | ... |

It should be noted that when the configuration manner of the initial table is configuration manner 2, before the user equipment uses this type of initial table, modulation schemes specifically used in the D modulation scheme sets need to be determined depending on an actual application scenario.

Configuration Manner 3:

The MCS initial table includes at least K modulation scheme sets, and the K modulation scheme sets include A modulation scheme sets and B modulation scheme sets. Each of the A modulation scheme sets includes π/2-BPSK modulation, and each of the B modulation scheme sets includes QPSK modulation. The MCS initial table further includes E modulation scheme sets, and each of the E modulation scheme sets includes M-QAM modulation. M-QAM modulation in the E modulation scheme sets may be modified to π/2-BPSK modulation, and the E modulation scheme sets are modulation scheme sets that are different from the K modulation scheme sets in the initial table, where A, B, and E are integers, M is a positive integer, 0≤A≤K, 0≤B≤K, and 0<E≤B. The MCS initial table may alternatively include another modulation scheme set.

It should be noted that configuration manner 3 is similar to configuration manner 1, but the table in configuration manner 3 supports modification of modulation schemes in the E modulation scheme sets.

For example, Table 8 is an example table of configuration manner 3. It is assumed that A=3, B=3, and E=2, MCS index numbers corresponding to the A modulation scheme sets include 0-2, MCS index numbers corresponding to the B modulation scheme sets include 3-5, and MCS index numbers corresponding to the E modulation scheme sets include 29 and 30.

TABLE 8

| MCS index | Modulation order | TBS index |
|---|---|---|
| 0 | 1 | 0 |
| 1 | 1 | 1 |
| 2 | 1 | 2 |
| 3 | 2 | 3 |
| 4 | 2 | 4 |
| 5 | 2 | 5 |
| ... | ... | ... |
| 18 | 4 | 17 |
| ... | ... | ... |
| 23 | 6 | 21 |
| ... | ... | ... |
| 29 | 8 | 25 |
| 30 | 8 | 26 |
| ... | ... | ... |

When determining that one corresponding coding scheme in the K modulation scheme sets may be configured with two modulation schemes, the network device may store the coding scheme and the modulation scheme that does not exist in the MCS table, in a row in which index numbers corresponding to the E modulation scheme sets are located.

For example, it is assumed that when it is determined that a modulation scheme corresponding to a TBS index 3 may be $\pi/2$-BPSK modulation, a modulation order of MCS index 30 may be configured to be 1 (that is, the modulation scheme is $\pi/2$-BPSK), and the TBS index is configured to be 3 (that is, a coding scheme corresponding to the TBS index 3).

It should be noted that the three configuration manners of the initial table may be applied to a scenario in which communication is performed by using an MCS table corresponding to a discrete Fourier transform orthogonal frequency division multiplexing DFT-S-OFDM waveform.

Configuration Manner 4:

The initial table includes a modulation and coding scheme set corresponding to a discrete Fourier transform orthogonal frequency division multiplexing DFT-S-OFDM waveform and a modulation and coding scheme set corresponding to an orthogonal frequency division multiplexing OFDM waveform, where modulation and coding schemes corresponding to K OFDM waveforms may be in any one of configuration manner 1, configuration manner 2, or configuration manner 3.

For example, Table 9 is an example table of configuration manner 4, including an MCS index, a modulation order 1, a modulation order 2, and a TBS index, where (the modulation order 1) is a modulation scheme corresponding to an OFDM waveform, and (the modulation order 2) is a modulation scheme corresponding to a DFT-S-OFDM waveform, MCS index numbers corresponding to modulation scheme sets that include $\pi/2$-BPSK modulation or QPSK modulation and that are corresponding to the modulation order 2 include 0-5, and any one of the foregoing configuration manners is used as a form corresponding to the six modulation scheme sets.

TABLE 9

| MCS index | Modulation order 1 | Modulation order 2 | TBS index |
|---|---|---|---|
| 0 | 2 | 1 | 0 |
| 1 | 2 | 1 | 1 |
| 2 | 2 | 1 | 2 |
| 3 | 2 | 2 | 3 |
| 4 | 2 | 2 | 4 |
| 5 | 2 | 2 | 5 |
| ... | ... | ... | ... |
| 18 | 4 | 4 | 17 |
| ... | ... | ... | ... |
| 23 | 6 | 6 | 21 |
| ... | ... | ... | ... |
| 29 | 8 | 8 | 25 |
| 30 | 8 | 8 | 26 |
| ... | ... | ... | ... |

The following specifically describes the communication method provided in the embodiments of this application with reference to FIG. 2.

Scenario 1: A network device and user equipment agree in a protocol to use a same rule for processing, or the network device configures the user equipment to use a same rule for processing. When determining and updating an MCS table, the user equipment does not require determining by the network device.

Figure 3:
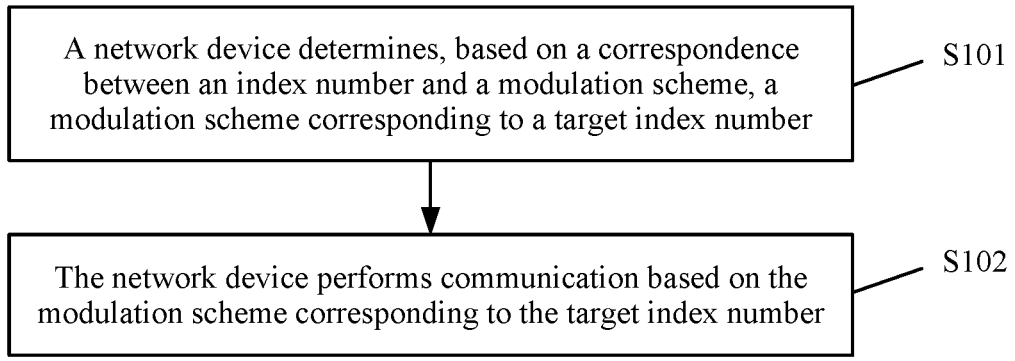
FIG. 3 is a schematic flowchart of a communication method according to an embodiment of this application.

FIG. 3 is a schematic flowchart of a communication method according to an embodiment of this application, including steps S101 and S102.

S101. A network device determines, based on a correspondence between an index number and a modulation scheme, a modulation scheme corresponding to a target index number.

The correspondence between an index number and a modulation scheme includes that each index number is corresponding to one modulation scheme set, the modulation scheme set includes at least one modulation scheme, each of K modulation scheme sets includes $\pi/2$-BPSK modulation or QPSK modulation, and K is an integer greater than 0.

S102. The network device performs communication based on the modulation scheme corresponding to the target index number.

It should be noted that the network device may communicate with user equipment based on the modulation scheme corresponding to the target index number.

Specifically, with reference to FIG. 2, the processor 201 in the computer device 200 may be configured to support the network device in performing steps S101 and S102 in this embodiment of this application.

According to the communication method provided in this embodiment of this application, the network device can flexibly select, by using at least one modulation scheme included in one modulation scheme set, a modulation scheme for communicating with the user equipment.

Figure 4:
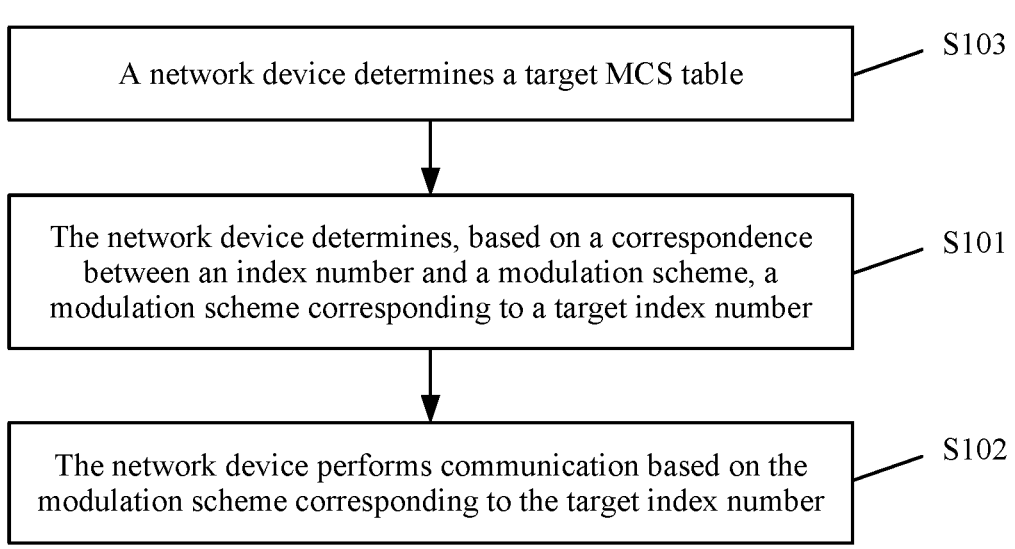
FIG. 4 is a schematic flowchart of another communication method according to an embodiment of this application.

Optionally, before the network device performs step S101, as shown in FIG. 4, the method further includes step S103:

S103. The network device determines a target MCS table.

The target MCS table includes K modulation scheme sets, and the target MCS table is an MCS table in which the target index number is located.

Optionally, the network device may store at least one MCS table. Before using the target MCS table, the network device may store the target MCS table or determine the target MCS table based on another MCS table. This is not specifically limited in this embodiment of this application.

It should be noted that normal communication can be performed only when a configuration manner of the target MCS table determined by the network device is the same as a configuration manner of a target MCS table determined by the user equipment.

It should be noted that the network device may communicate with one or more user equipments one or more times by using one MCS table, and each user equipment may communicate with different network devices one or more times by using one MCS table. This is not specifically limited in this embodiment of this application.

Specifically, with reference to FIG. 2, the processor 201 in the computer device 200 may be configured to support the network device in performing step S103 in this embodiment of this application.

Based on this solution, the network device can determine a same MCS table used when communicating with the user equipment.

Optionally, the target MCS table includes K modulation scheme sets. In the K modulation scheme sets, each of K1 modulation scheme sets includes $\pi/2$-BPSK modulation, and each of (K−K1) modulation scheme sets includes QPSK modulation, where K1 is an integer, $0 \leq K1 \leq K$, and $0 \leq (K-K1) \leq K$. For example, Table 5a is an example table of the target MCS table. It is assumed that K=6, K1=4, and K2=2 in Table 5a. MCS index numbers corresponding to the K1 modulation scheme sets include 0-3, and MCS index numbers corresponding to K2 modulation scheme sets include 4 and 5. A modulation scheme set corresponding to another MCS index may be determined based on an existing modulation scheme. A modulation scheme in the modulation scheme set corresponding to the another MCS index number is not specifically limited in this embodiment of this application.

TABLE 5a

| MCS index | Modulation order | TBS index |
|---|---|---|
| 0 | 1 | 0 |
| 1 | 1 | 1 |
| 2 | 1 | 2 |
| 3 | 1 | 3 |
| 4 | 2 | 4 |
| 5 | 2 | 5 |
| ... | ... | ... |
| 18 | 4 | 17 |
| ... | ... | ... |
| 23 | 6 | 21 |
| ... | ... | ... |
| 29 | 8 | 26 |
| ... | ... | ... |

Optionally, the target MCS table includes K modulation scheme sets and N modulation scheme sets. Each of the N modulation scheme sets includes multiple quadrature amplitude modulation M-QAM or π/2-BPSK modulation, where N and M are positive integers.

Optionally, if corresponding coding schemes in the N modulation scheme sets are the same as corresponding coding schemes in the K modulation scheme sets, the modulation schemes in the N modulation scheme sets are π/2-BPSK modulation, and N≤M.

Optionally, the target MCS table of the N modulation scheme sets in the method may be an initial table, or may be an MCS table determined based on the initial table. This is not specifically limited in this embodiment of this application.

It should be noted that in this embodiment of this application, the target MCS table not only includes N+K modulation scheme sets, but also includes another modulation scheme set. For a modulation scheme corresponding to an MCS index number corresponding to the another modulation scheme set, refer to an existing configuration manner. This is not specifically limited in this embodiment of this application.

For example, Table 7a is an example table of the target MCS table, where Table 7a is determined based on the initial Table 7. It is assumed that N=2. When it is determined that π/2-BPSK or QPSK may be used for a same TBS in different scenarios, modulation schemes and coding schemes in the two modulation scheme sets in the target MCS table can be switched. For example, Table 7 is switched to a form of Table 7a, where a modulation order corresponding to an MCS index number 29 is switched to 1, and a coding scheme is switched to 3; and a modulation order corresponding to an MCS index number 30 is switched to 1, and a coding scheme is switched to 4.

TABLE 7a

| MCS index | Modulation order | TBS index |
|---|---|---|
| 0 | 1 | 0 |
| 1 | 1 | 1 |
| 2 | 1 | 2 |
| 3 | 2 | 3 |
| 4 | 2 | 4 |
| 5 | 2 | 5 |

TABLE 7a-continued

| MCS index | Modulation order | TBS index |
|---|---|---|
| ... | ... | ... |
| 18 | 4 | 17 |
| ... | ... | ... |
| 23 | 6 | 21 |
| ... | ... | ... |
| 29 | 1 | 3 |
| 30 | 1 | 4 |
| ... | ... | ... |

Based on this solution, the network device can flexibly select a proper target MCS table from MCS tables in different configuration manners, so as to provide a basis for selecting, by the network device, a debugging scheme for communication between the user equipment and the user equipment.

In this embodiment of this application, before the network device and the user equipment communicate with each other, the network device and the user equipment may determine the target MCS table in a plurality of manners. The target MCS table is an MCS table used by the network device to select a modulation scheme for communication with the current user equipment.

Figure 5:
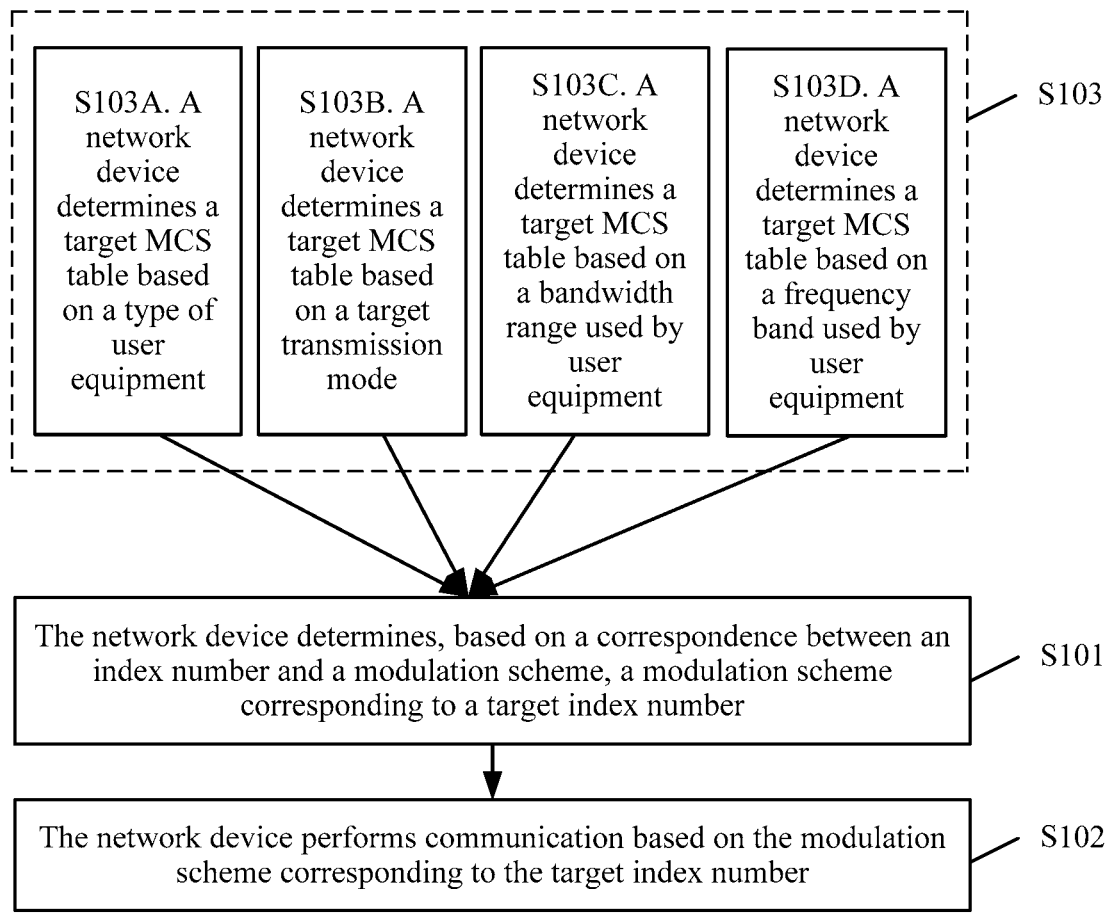
FIG. 5 is a schematic flowchart of another communication method according to an embodiment of this application.

Optionally, when the network device determines the target MCS table by using different rules, FIG. 5 is a schematic flowchart of a communication method according to an embodiment of this application. Step S103 may specifically include step S103A, S103B, S103C, or S103D.

S103A. The network device determines the target MCS table based on a type of user equipment.

There is a correspondence between the type of the user equipment and the target MCS table.

Optionally, the user equipment may store the target MCS table, or may not store the target MCS table. This is not specifically limited in this embodiment of this application.

When both the network device and the user equipment determine the target MCS table based on the type of the user equipment, before the network device uses the MCS table, the network device may determine the type of the user equipment based on information about accessing the network device by the user equipment.

It should be noted that in this embodiment of this application, the network device may prestore different MCS tables, and the user equipment stores an MCS table corresponding to the type of the user equipment. Certainly, when there is a new type of user equipment, an MCS table corresponding to the new type of user equipment may be configured and stored in the network device. This is not specifically limited in this embodiment of this application.

S103B. The network device determines the target MCS table based on a target transmission mode.

The target transmission mode is a frequency domain spectral shaping FDSS technology or a coverage enhancement mode, and the network device instructs the user equipment to use the target transmission mode.

Optionally, the user equipment stores at least one MCS table that is corresponding to the target transmission mode.

When both the network device and the user equipment determine the target MCS table based on the target transmission mode, and the network device instructs the user equipment to use the target transmission mode, the network device may determine the target MCS table corresponding to the target transmission mode.

It should be noted that, in some scenarios, for example, in an area having a weak signal or the user equipment being in a vehicle moving at a relatively high speed, when the user equipment uses a normal transmission mode, user experience is poor. In this case, to make a user obtain better experience, usually the network device may instruct the user equipment to change the transmission mode, for example, instruct the user equipment to enable the FDSS technology or use the coverage enhancement mode. In this embodiment of this application, the target transmission mode is bound to different MCS tables. When the network device instructs the user equipment to use these technologies, the network device may determine that a corresponding MCS table needs to be switched to.

S103C. The network device determines the target MCS table based on a bandwidth range used by user equipment.

There is a mapping relationship between the bandwidth range and the target MCS table.

Optionally, the user equipment stores at least one MCS table that is corresponding to the bandwidth range.

When the target MCS table is determined based on the bandwidth range used by the user equipment, and the bandwidth range of the user equipment changes, the network device determines that an MCS table corresponding to a changed bandwidth range is a currently used MCS table.

It should be noted that, in this embodiment of this application, MCS tables used for different bandwidth ranges are stored in the network device and the user equipment. When a different bandwidth range is used by the user equipment, the network device and the user equipment may select a modulation scheme and a coding scheme by using an MCS table corresponding to the bandwidth range. This increases communication flexibility and is applicable to more scenarios.

S103D. The network device determines the target MCS table based on a frequency band used by user equipment.

There is a mapping relationship between the frequency band and the target MCS table.

Optionally, the user equipment stores at least one MCS table that is corresponding to the frequency band.

When the network device and the user equipment determine the target MCS table by using the frequency band used by the user equipment, and the frequency band for the user equipment changes, the network device determines that an MCS table corresponding to a changed frequency band is a currently used MCS table.

Specifically, with reference to FIG. 2, the processor 201 in the computer device 200 may be configured to support the network device in performing step S103A, S103B, S103C, or S103D in this embodiment of this application.

According to the communication method provided in this embodiment of this application, the network device can select tables in different configuration manners for communication between the network device and the user equipment based on different determining manners, and this can provide a basis for flexible selection of a modulation scheme for communication between the network device and the user equipment.

Optionally, when the MCS table in the network device is the initial table, the network device can configure the modulation scheme set in the initial table at any moment before the MCS table is used. Therefore, the method further includes step S104:

S104. The network device determines modulation schemes in K modulation scheme sets in the target MCS table based on the initial table.

Specifically, with reference to FIG. 2, the processor 201 in the computer device 200 may be configured to support the network device in performing step S104 in this embodiment of this application.

Based on this solution, the network device can determine a specific configuration of the target MCS table, so as to avoid a problem that when the network device uses the target MCS table, poor experience is caused because an MCS defined in the table does not match an MCS required by an actual application scenario.

It should be noted that not all initial tables in this embodiment of this application need to undergo step S104, and only in a specific scenario, the modulation schemes in the K modulation scheme sets need to be determined. The following specifically describes a scenario in which step S104 needs to be performed.

Optionally, if the modulation schemes included in the K modulation scheme sets in the initial table are π/2-BPSK modulation and QPSK modulation, step S104 may specifically include S104A:

S104A. The network device determines that modulation schemes in K2 modulation scheme sets in the K modulation scheme sets in the target MCS table are π/2-BPSK modulation, and modulation schemes in (K−K2) modulation scheme sets in the K modulation scheme sets are QPSK modulation.

K2 is an integer, and 0<K2<K.

It should be noted that, in this scenario, because one modulation scheme set in the K modulation scheme sets includes two modulation schemes, when the network device and the user equipment use this type of table, if a selected target index number is an MCS index number corresponding to the K modulation scheme sets and modulation schemes selected by the network device and the user equipment are different, the network device and the user equipment cannot normally communicate with each other.

It should be noted that, after determining the modulation scheme, the network device further needs to determine the coding scheme. Coding schemes corresponding to different modulation schemes corresponding to a same MCS index number may be independently configured. For example, when the coding scheme is represented by using a code rate, a code rate corresponding to π/2-BPSK modulation may be twice a code rate corresponding to QPSK modulation, or the code rates may be independently configured.

For example, when the initial table is Table 4, modulation schemes in modulation scheme sets corresponding to MCS index numbers 2 to 4 are π/2-BPSK modulation and QPSK modulation. It is assumed that the network device determines that modulation schemes in four modulation scheme sets are configured as π/2-BPSK modulation, and modulation schemes in two modulation scheme sets are configured as QPSK. A configuration manner is described in Table 4a.

TABLE 4a

| MCS index | Modulation order | TBS index |
|---|---|---|
| 0 | 1 | 0 |
| 1 | 1 | 1 |
| 2 | 1 | 2 |
| 3 | 1 | 3 |
| 4 | 2 | 4 |
| 5 | 2 | 5 |
| ... | ... | ... |
| 18 | 4 | 17 |
| ... | ... | ... |
| 23 | 6 | 21 |

TABLE 4a-continued

| MCS index | Modulation order | TBS index |
|---|---|---|
| ... | ... | ... |
| 29 | 8 | 26 |
| ... | ... | ... |

Optionally, the table may be alternatively configured in a form of Table 4b. When the MCS index is 3, the modulation order is configured to be 2 (namely, QPSK modulation); when the MCS index is 4, the modulation order is configured to be 1 (namely, π/2-BPSK modulation).

TABLE 4b

| MCS index | Modulation order | TBS index |
|---|---|---|
| 0 | 1 | 0 |
| 1 | 1 | 1 |
| 2 | 1 | 2 |
| 3 | 2 | 3 |
| 4 | 1 | 4 |
| 5 | 2 | 5 |
| ... | ... | ... |
| 18 | 4 | 17 |
| ... | ... | ... |
| 23 | 6 | 21 |
| ... | ... | ... |
| 29 | 8 | 26 |
| ... | ... | ... |

Optionally, the table may be alternatively configured in a form of Table 4c. When the MCS index number is 2, the modulation order may be configured to be 2 (namely, QPSK modulation); when the MCS index numbers are 3 and 4, the modulation orders may be configured to be 1 (namely, π/2-BPSK modulation).

TABLE 4c

| MCS index | Modulation order | TBS index |
|---|---|---|
| 0 | 1 | 0 |
| 1 | 1 | 1 |
| 2 | 2 | 2 |
| 3 | 1 | 3 |
| 4 | 1 | 4 |
| 5 | 2 | 5 |
| ... | ... | ... |
| 18 | 4 | 17 |
| ... | ... | ... |
| 23 | 6 | 21 |
| ... | ... | ... |
| 29 | 8 | 26 |
| ... | ... | ... |

It should be noted that when configuring the target MCS table based on the initial table, the network device can flexibly select a configuration manner of the table depending on a requirement. For example, one MCS index number is selected, a modulation scheme set corresponding to an MCS index number greater than the MCS index number is configured as QPSK modulation, and a modulation scheme set corresponding to an MCS index number less than or equal to the index number is configured as π/2-BPSK modulation. Alternatively, two MCS index numbers are selected; among the two index numbers, a modulation scheme set corresponding to an odd MCS index number is configured as π/2-BPSK modulation, and a modulation scheme set corresponding to an even MCS index number is configured as QPSK modulation. Alternatively, the network device determines the configuration manner of the table based on a maximum power output characteristic (for example, a power gain of π/2-BPSK relative to QPSK) of the user equipment, a frequency band, a scheduling bandwidth, a terminal type, a transmission mode, a parameter uploaded by the UE, or the like. No specific limitation is imposed on a configuration manner and a configuration reference condition of the modulation schemes in the K modulation scheme sets in this embodiment of this application.

Specifically, with reference to FIG. 2, the processor 201 in the computer device 200 may be configured to support the network device in performing step S104A in this embodiment of this application.

According to the communication method provided in this embodiment of this application, an undetermined modulation scheme in the initial table is flexibly configured as a determined modulation scheme, and this provides a basis for flexible communication between the network device and the user equipment.

Optionally, if the modulation schemes included in the K modulation scheme sets in the initial table are QPSK modulation, step S104 may specifically include step S104B:

S104B. The network device determines that modulation schemes in K2 modulation scheme sets in the K modulation scheme sets in the target MCS table are π/2-BPSK modulation, where $0 \le K2 \le K$.

It should be noted that when initial modulation schemes in the K modulation scheme sets in the initial table are QPSK modulation, the initial modulation schemes are only applicable to a transmission waveform OFDM waveform. For a DFT-S-OFDM waveform in a 5G NR system used by the user equipment, the initial table cannot provide a proper modulation scheme for the user equipment. When the user uses QPSK modulation, a use effect may be undesirable, and user experience is poor. Therefore, step S104B may be performed to configure QPSK in the K modulation scheme sets as π/2-BPSK modulation having a better transmission effect.

Optionally, the network device may configure modulation schemes in all of the K modulation scheme sets as π/2-BPSK modulation, or may configure modulation schemes in some modulation scheme sets as π/2-BPSK modulation. This is not specifically limited in this embodiment of this application.

It should be noted that, in this embodiment of this application, the initial table can be always stored in the network device. After the modulation scheme in the initial table is configured, the initial table is not overwritten. The network device may configure different modulation schemes for the K modulation scheme sets based on different user equipments.

It should be noted that when the network device has modified the initial table, the user equipment may still use the initial table to send data to the network device, and the network device may parse the data based on the initial table. In this case, the network device may send instruction information to the user equipment to instruct the user equipment to communicate with the network device based on a new MCS table.

Specifically, with reference to FIG. 2, the processor 201 in the computer device 200 may be configured to support the network device in performing step S104B in this embodiment of this application.

According to the communication method provided in this embodiment of this application, when the network device determines that a waveform used by the user equipment is a DFT-S-OFDM waveform, and the initial table is an MCS table corresponding to an OFDM waveform, QPSK modulation in the MCS table corresponding to the OFDM waveform may be configured as π/2-BPSK modulation, to obtain a table corresponding to the DFT-S-OFDM waveform provided in this embodiment of this application. This can provide a basis for flexible selection of a modulation scheme for communication between the network device and the user equipment.

Optionally, when the network device determines that the currently used MCS table is improper, the method further includes step S105:

S105. The network device updates a modulation scheme in the K modulation scheme sets in the target MCS table.

Optionally, based on which of π/2-BPSK modulation and QPSK is better as determined within a period of time, the network device may choose to update the modulation scheme in the K modulation scheme sets.

Specifically, with reference to FIG. 2, the processor 201 in the computer device 200 may be configured to support the network device in performing step S105 in this embodiment of this application.

Based on the foregoing solution, the network device can update the modulation scheme in the target MCS table, and can flexibly perform updating depending on an application scenario, and this provides a basis for flexible selection of a modulation scheme for communication between the network device and the user equipment.

Optionally, before step S105, the method further includes step S106. S105 is specifically 105A.

S106. The network device determines a value of a target parameter or a target preset correspondence.

The target parameter includes a maximum output power gain, a carrier frequency range, or a bandwidth range, and the target preset correspondence includes a preset correspondence between values of target parameters and modulation schemes in the K modulation scheme sets.

S105A. The network device updates the modulation scheme in the K modulation scheme sets in the target MCS table based on the target parameter or the target preset correspondence.

Optionally, in this embodiment of this application, the network device may alternatively update the modulation scheme in the K modulation scheme sets based on a frequency band used by the user equipment. This is not specifically limited in this embodiment of this application.

It should be noted that in this embodiment of this application, for different parameter values, modulation schemes in the K modulation scheme sets may be configured in different forms. For example, when the maximum output power gain is 1 dB, coding schemes corresponding to MCS index numbers 1-3 have better effects if a modulation scheme of π/2-BPSK modulation is used. When the maximum output power gain is 2 dB, coding schemes corresponding to MCS index numbers 1-4 have better effects if a modulation scheme of π/2-BPSK modulation is used. In this case, a modulation scheme corresponding to an MCS index number 4 may be modified to π/2-BPSK.

Specifically, with reference to FIG. 2, the processor 201 in the computer device 200 may be configured to support the network device in performing steps S106 and S105A in this embodiment of this application.

Based on this solution, the network device can update the target MCS table based on the target parameter or the target preset correspondence.

It should be noted that in this scenario, the user equipment may also perform the communication method in this embodiment of this application with reference to the foregoing steps related to the network device. In this scenario, when the user equipment and the network device communicate with each other, a same protocol is used to determine the MCS table and update the MCS table.

Figure 6:
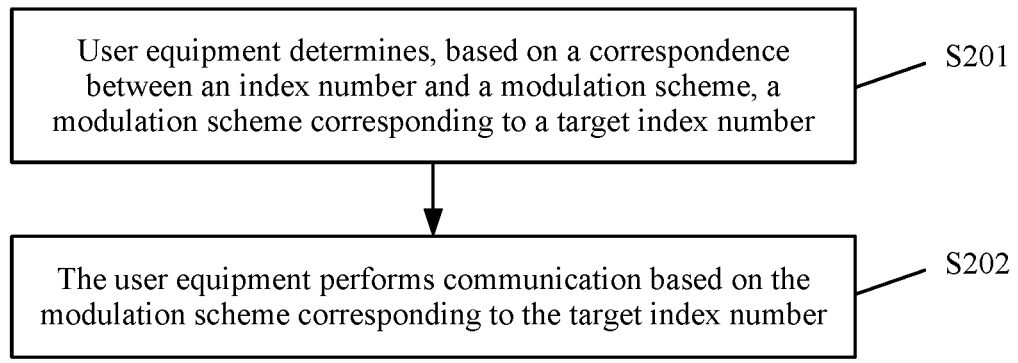
FIG. 6 is a schematic flowchart of another communication method according to an embodiment of this application.

The following briefly describes operations performed by user equipment. FIG. 6 is a schematic flowchart of a communication method according to an embodiment of this application, including steps S201 and S202.

S201. User equipment determines, based on a correspondence between an index number and a modulation scheme, a modulation scheme corresponding to a target index number.

For the correspondence between an index number and a modulation scheme, refer to the foregoing description of the network device. Details are not described herein again.

S202. The user equipment performs communication based on the modulation scheme corresponding to the target index number.

It should be noted that the user equipment may communicate with the network device based on the modulation scheme corresponding to the target index number.

Specifically, with reference to FIG. 2, the processor 201 in the computer device 200 may be configured to support the user equipment in performing steps S201 and S202 in this embodiment of this application.

According to the communication method provided in this embodiment of this application, the user equipment can flexibly select, by using at least one modulation scheme included in one modulation scheme set, a modulation scheme for communicating with the network device.

Before the user equipment determines, based on the correspondence between an index number and a modulation scheme, the modulation scheme corresponding to the target index number, the communication method further includes step S203:

S203. The user equipment determines a target MCS table.

Optionally, the user equipment may store at least one MCS table. Before using the target MCS table, the user equipment may store the target MCS table or determine the target MCS table based on another MCS table. This is not specifically limited in this embodiment of this application.

For a specific modulation scheme in a modulation scheme set in the target MCS table, refer to the description of the network device side. Details are not described herein again.

Specifically, with reference to FIG. 2, the processor 201 in the computer device 200 may be configured to support the user equipment in performing step S203 in this embodiment of this application.

Based on this solution, the user equipment can determine a same MCS table used when communicating with the network device.

Specifically, when the user equipment and the network device determine the target MCS table by using a same rule, step S203 may specifically include step S203A, S203B, S203C, or S203D.

S203A. The user equipment determines the target MCS table based on a type of the user equipment.

S203B. The user equipment determines the target MCS table based on a target transmission mode.

Optionally, after the user equipment switches to the target transmission mode, the user equipment may communicate with the network device directly by using an MCS table corresponding to the target transmission mode.

S203C. The user equipment determines the target MCS table based on a bandwidth range used by the user equipment.

It should be noted that when the target MCS table is determined based on the bandwidth range used by the user equipment, and the user equipment detects that the bandwidth range used by the user changes, the user equipment may directly determine, based on a current bandwidth range, to use an MCS table corresponding to the current bandwidth range as the target MCS table.

S203D. The user equipment determines the target MCS table based on a frequency band used by the user equipment.

Specifically, with reference to FIG. 2, the processor 201 in the computer device 200 may be configured to support the user equipment in performing step S203A, S203B, S203C, or S203D in this embodiment of this application.

It is assumed that when the user equipment uses the MCS table for the first time, the user equipment determines whether an initial MCS table has an undetermined item or is inapplicable to an NR system. Before using the initial table, the user equipment needs to configure the initial table. Optionally, before step S203, the method further includes step S204:

S204. The user equipment determines modulation schemes in K modulation scheme sets in the target MCS table based on the initial table.

Specifically, with reference to FIG. 2, the processor 201 in the computer device 200 may be configured to support the user equipment in performing step S204 in this embodiment of this application.

Based on this solution, the user equipment can determine a specific configuration of the target MCS table, so as to avoid a problem that when the user equipment uses the target MCS table, poor experience is caused because an MCS defined in the table does not match an MCS required by an actual application scenario.

It should be noted that not all initial tables in this embodiment of this application need to undergo step S204, and only in a specific scenario, the modulation schemes in the K modulation scheme sets need to be determined. The following specifically describes a scenario in which step S204 needs to be performed.

Optionally, if the modulation schemes included in the K modulation scheme sets in the initial table are π/2-BPSK modulation and QPSK modulation, step S204 may specifically include S204A:

S204A. The user equipment determines that modulation schemes in K2 modulation scheme sets in the K modulation scheme sets in the target MCS table are π/2-BPSK modulation, and modulation schemes in (K−K2) modulation scheme sets in the K modulation scheme sets are QPSK modulation, where K2 is an integer, and 0<K2<K.

Specifically, with reference to FIG. 2, the processor 201 in the computer device 200 may be configured to support the user equipment in performing step S204A in this embodiment of this application.

Optionally, if the modulation schemes included in the K modulation scheme sets in the initial table are QPSK modulation, step S204 specifically includes step S204B:

S204B. The user equipment determines that modulation schemes in K2 modulation scheme sets in the K modulation scheme sets in the target MCS table are π/2-BPSK modulation, where 0≤K2≤K.

Specifically, with reference to FIG. 2, the processor 201 in the computer device 200 may be configured to support the user equipment in performing step S204B in this embodiment of this application.

Optionally, when determining that the used table is improper, for example, when proper communication cannot be performed by using a configuration in the current table, the method may further include step S205:

S205. The user equipment updates a modulation scheme in the K modulation scheme sets in the target MCS table.

Specifically, with reference to FIG. 2, the processor 201 in the computer device 200 may be configured to support the user equipment in performing step S205 in this embodiment of this application.

By updating the modulation scheme in the MCS table, updating can be flexibly performed depending on an application scenario, and this provides a basis for flexible selection of a modulation scheme for communication between the user equipment and the network device.

Before the updating, the method further includes step S206. Step S205 includes S205A.

S206. The user equipment determines a value of a target parameter or a target preset correspondence.

The target parameter includes a maximum output power gain, a carrier frequency range, or a bandwidth range, and the target preset correspondence includes a preset correspondence between values of target parameters and modulation schemes in the K modulation scheme sets.

S205A. The user equipment updates the modulation scheme in the K modulation scheme sets in the target MCS table based on the target parameter or the target preset correspondence.

Specifically, with reference to FIG. 2, the processor 201 in the computer device 200 may be configured to support the user equipment in performing steps S206 and S205A in this embodiment of this application.

According to the communication method provided in this embodiment of this application, when the user equipment and the network device use a same protocol, the user equipment can flexibly select an MCS table suitable for the user equipment when using the target MCS table, and this provides a basis for flexible selection of a modulation scheme for communication between the user equipment and the network device.

Embodiment 2

User equipment is incapable of directly configuring an MCS table or update an MCS table. Configuration and updating of the MCS table on the user equipment side need to be determined by a network device.

Figure 7:
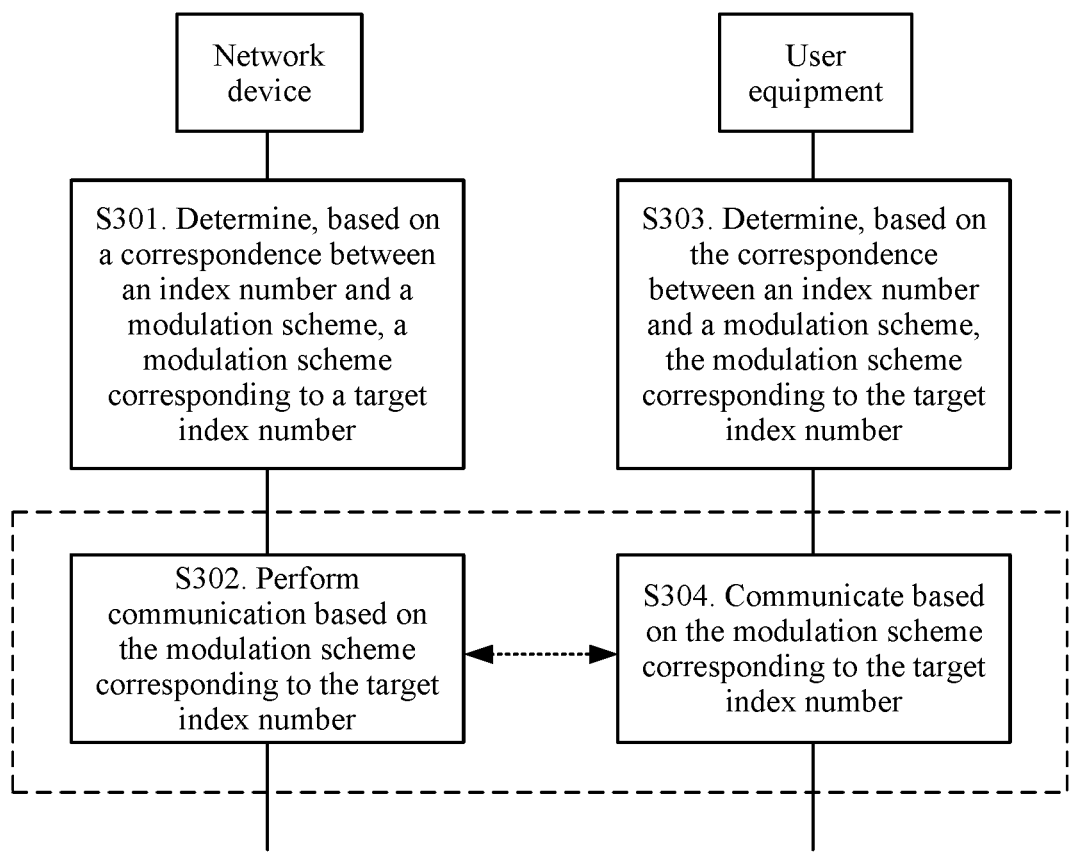
FIG. 7 is a schematic interaction diagram of a communication method according to an embodiment of this application.

FIG. 7 is a schematic interaction diagram of a communication method according to an embodiment of this application, including steps S301 to S304.

S301. A network device determines, based on a correspondence between an index number and a modulation scheme, a modulation scheme corresponding to a target index number.

S302. The network device performs communication based on the modulation scheme corresponding to the target index number.

S303. User equipment determines, based on the correspondence between an index number and a modulation scheme, the modulation scheme corresponding to the target index number.

S304. The user equipment performs communication based on the modulation scheme corresponding to the target index number.

Specifically, with reference to FIG. 2, the processor 201 in the computer device 200 may be configured to support the network device in performing steps S301 and S302 in this embodiment of this application, and the processor 201 may be further configured to support the user equipment in performing steps S303 and S304 in this embodiment of this application.

Optionally, before step S301, the method further includes step S305. Before S303, the communication method further includes S306.

S305. The network device determines a target MCS table.

S306. The user equipment determines the target MCS table.

For a modulation scheme in a modulation scheme set in the target MCS table, refer to the description in the foregoing embodiment.

Specifically, with reference to FIG. 2, the processor 201 in the computer device 200 may be configured to support the network device in performing step S305 in this embodiment of this application, and the processor 201 may be further configured to support the user equipment in performing step S306 in this embodiment of this application.

Optionally, the network device may select a proper MCS table for the network device and the user equipment by using at least one rule. Step S305 may be specifically S305A, S305B, S305C, or S305D.

For S305A, refer to S103A in the foregoing embodiment. For S305B, refer to S103B in the foregoing embodiment. For S305C, refer to S103C in the foregoing embodiment. For S305D, refer to S103D in the foregoing embodiment.

Optionally, the network device may further determine the target MCS table based on another condition. In the method, step S305 further includes step S305E:

S305E. The network device specifies an MCS table as the target MCS table.

Optionally, it is assumed that the network device does not determine the target MCS table by itself, the network device may determine the target MCS table and send the target MCS table to the network device.

Specifically, with reference to FIG. 2, the processor 201 in the computer device 200 may be configured to support the network device in performing step S305A, S305B, S305C, S305D, or S305E in this embodiment of this application.

The user equipment may determine the target MCS table by using a plurality of rules. Optionally, step S306 may specifically include S306B1, S306B2, S306B3, or S306B4.

For S306B1, refer to S203A; for S306B2, refer to S203B; for S306B3, refer to S203C; and for S306B4, refer to S203D.

Specifically, with reference to FIG. 2, the processor 201 in the computer device 200 may be configured to support the user equipment in performing step S306B1, S306B2, S306B3, or S306B4 in this embodiment of this application.

It is assumed that the user equipment determines the target MCS table, and the user equipment sends the target MCS table determined by the user equipment to the network device. Before step S305, the method further includes step S307. Step S305 may further include step S305F1 and S305F2.

S307. The user equipment sends a first MCS table to the network device.

The first MCS table is the target MCS table determined by the user equipment.

S305F1. The network device receives the first MCS table sent by the user equipment.

S305F2. The network device determines the target MCS table based on the first MCS table.

It should be noted that the network device may directly determine the first MCS table as the target MCS table, or may determine a new MCS table as the target MCS table based on the first MCS table. This is not specifically limited in this embodiment of this application.

Specifically, with reference to FIG. 2, the processor 201 in the computer device 200 may be configured to support the user equipment in performing step S307 in this embodiment of this application, and the processor 201 may be configured to support the network device in performing steps S305F1 and S305F2 in this embodiment of this application.

Optionally, the method further includes step S308, and step S306 includes steps S306A1 and S306A2.

S308. The network device sends indication information of the target MCS table to the user equipment.

The indication information of the target MCS table is used to indicate information about the target MCS table.

It should be noted that, on one hand, after determining the target MCS table, the network device may send information about the determined target MCS table to the user equipment. On the other hand, after determining the target MCS table, the user equipment may send information about the determined target MCS table to the network device. After the network device or the user equipment determines the target MCS table, no specific limitation is imposed on whether to send the indication information of the target MCS table in this embodiment of this application.

Optionally, after the network device receives the first MCS table, the network device needs to determine whether the first MCS table can serve as the target MCS table used by the network device and the user equipment. When the network device determines that the first MCS table can be used, the indication information that is of the target MCS table and that is sent by the network device to the user equipment is used to instruct the user equipment to use the first MCS table as the target MCS table. When determining that the first MCS table cannot adapt to a current scenario, the network device may re-determine, according to S305A, S305B, or S305C, an MCS table that is suitable for communication between the network device and the user equipment as the target MCS table. The indication information that is of the target MCS table and that is sent by the network device to the user equipment carries the MCS table re-indicated by the network device.

Specifically, with reference to FIG. 2, the processor 201 in the computer device 200 may be configured to support the user equipment in performing step S308 in this embodiment of this application.

In this embodiment of this application, when determining that the target MCS table determined by the user equipment cannot adapt to the current scenario, the network device may send the indication information of the target MCS table to the user equipment, so that the user equipment can flexibly select a modulation scheme when communicating with the network device based on the target MCS table determined by the network device side.

Optionally, the indication information of the target MCS table is sent by the network device to the user equipment by using downlink control signaling (DCI), radio resource control (RRC) signaling, or a media access control (MAC) control element (CE).

S306A1. The user equipment receives the indication information that is of the target MCS table and that is sent by the network device.

S306A2. The user equipment determines the target MCS table according to the indication information of the target MCS table.

Specifically, with reference to FIG. 2, the processor 201 in the computer device 200 may be configured to support the user equipment in performing step S306A1 and step S306A2 in this embodiment of this application.

When the target MCS table used by the user equipment and the network device is an initial table, if modulation schemes corresponding to some MCS index numbers in the initial table are undetermined, or an initial table configuration cannot adapt to the current application scenario, before S305, the communication method further includes step S309; or before S306, the communication method further includes step S310.

S309. The network device determines modulation schemes in K modulation scheme sets in the target MCS table based on the initial table.

Specifically, for the modulation schemes that are in the K modulation scheme sets in the target MCS table and that are determined by the network device based on the initial table, refer to step S104A or S104B in the foregoing embodiment.

S310. The user equipment determines modulation schemes in K modulation scheme sets in the target MCS table based on the initial table.

Specifically, for the modulation schemes that are in the K modulation scheme sets in the target MCS table and that are determined by the user equipment based on the initial table, refer to step S204A or S204B in the foregoing embodiment.

It should be noted that for a configuration manner of the initial table of the network device and the user equipment, refer to the foregoing configuration manner of the initial table. This is not specifically limited in this embodiment of this application.

Specifically, with reference to FIG. 2, the processor 201 in the computer device 200 may be configured to support the network device in performing step S309 in this embodiment of this application, and the processor 201 may be further configured to support the user equipment in performing step S310 in this embodiment of this application.

Optionally, when the user equipment does not determine the modulation schemes in the K modulation scheme sets in the target MCS table, after the network device determines the modulation schemes in the K modulation scheme sets in the target MCS table, and the network device sends modulation scheme configuration information to the user equipment. The modulation scheme configuration information is used to indicate the modulation schemes that are in the K modulation scheme sets in the target MCS table and that are determined by the network device. After receiving the modulation scheme configuration information sent by the network device, the user equipment determines the modulation schemes in the K modulation scheme sets in the target MCS table in the user equipment based on the modulation scheme configuration information.

Optionally, when the network device does not determine the modulation schemes in the K modulation scheme sets in the target MCS table, after the user equipment determines the modulation schemes in the K modulation scheme sets in the target MCS table, the user equipment cannot directly use the MCS table determined by the user equipment. The user equipment sends modulation scheme configuration information to the network device. The modulation scheme configuration information is used to indicate the modulation schemes that are in the K modulation scheme sets in the target MCS table and that are determined by the user equipment. After receiving the modulation scheme configuration information sent by the user equipment, the network device determines a configuration indication based on the modulation scheme configuration information. The acknowledgement configuration indication carries acknowledgement information or the modulation schemes in the K modulation scheme sets configured by the network device, and the acknowledgement information instructs the user equipment to configure the modulation schemes in the K modulation scheme sets in the target MCS table based on the modulation scheme configuration information. The network device sends the acknowledgement configuration indication to the user equipment, and the user equipment receives the acknowledgement configuration indication sent by the network device. The user equipment determines that the user equipment configures the modulation schemes in the K modulation scheme sets.

It should be noted that, when the MCS table in the user equipment and the network device is the initial table, modulation schemes corresponding to some MCS index numbers may be undetermined in the table. For example, if two modulation schemes are included in a modulation scheme set in the initial MCS table, and during use of this type of table, the user equipment and the network device cannot determine a specific modulation scheme to be used, a corresponding modulation scheme needs to be configured when the initial table exists in the user equipment.

It should be noted that in this embodiment of this application, the user equipment cannot directly use a configuration of the user equipment unless the user equipment receives an indication from the network device.

When the network device or the user equipment determines that the currently used MCS table cannot satisfy the use scenario, the communication method further includes updating a modulation scheme in the K modulation scheme sets in the target MCS table. In other words, steps S311 and S312 are included.

S311. The network device updates a modulation scheme in the K modulation scheme sets in the target MCS table.

S312. The user equipment updates a modulation scheme in the K modulation scheme sets in the target MCS table.

Specifically, with reference to FIG. 2, the processor 201 in the computer device 200 may be configured to support the network device in performing step S311 in this embodiment of this application, and the processor 201 may be further configured to support the user equipment in performing step S312 in this embodiment of this application.

Before step S312, the method further includes steps S313 and S314. Step S312 is specifically S312A.

S313. The network device sends update indication information to the user equipment.

The update indication information is used to instruct the user equipment to update the modulation scheme in the K modulation scheme sets in the target MCS table.

Optionally, the update indication information is sent by the network device to the user equipment by using the DCI, the RRC, or the MAC CE.

Specifically, with reference to FIG. 2, the processor 201 in the computer device 200 may be configured to support the network device in performing step S313 in this embodiment of this application.

S314. The user equipment receives the update indication information sent by the network device.

S312A. The user equipment updates the modulation scheme in the K modulation scheme sets in the target MCS table according to the update indication information.

Specifically, with reference to FIG. 2, the processor 201 in the computer device 200 may be configured to support the network device in performing step S314 in this embodiment of this application, and the processor 201 may be further configured to support the user equipment in performing step S312 in this embodiment of this application.

Optionally, the user equipment may alternatively send update indication information to the network device. The update indication information is used to indicate information about the modulation scheme that is in the K modulation scheme sets in the target MCS table and that is updated by the user equipment. The network device updates the modulation scheme in the K modulation scheme sets in the target MCS table according to the update indication information sent by the user equipment.

Optionally, the communication method further includes step S315, and S311 may be specifically S311A.

S315. The network device determines a value of a target parameter or a target preset correspondence.

For the target parameter, refer to the description in the foregoing embodiment. Details are not described herein again.

Optionally, the value of the target parameter or the target preset correspondence may be directly determined by the network device, or may be uploaded by the user equipment. This is not specifically limited in this embodiment of this application.

S311A. The network device updates the modulation scheme in the K modulation scheme sets in the target MCS table based on the target parameter or the target preset correspondence.

Specifically, with reference to FIG. 2, the processor 201 in the computer device 200 may be configured to support the network device in performing steps S315 and S311A in this embodiment of this application.

Optionally, the communication method further includes step S316, and S312 may be specifically S312B.

S316. The user equipment determines a value of a target parameter or a target preset correspondence.

S312B. The user equipment updates the modulation scheme in the K modulation scheme sets in the target MCS table based on the target parameter or the target preset correspondence.

Specifically, with reference to FIG. 2, the processor 201 in the computer device 200 may be configured to support the user equipment in performing steps S316 and S312B in this embodiment of this application.

Optionally, before S312, the communication method may further include S317. Step S315 is specifically S315A and S315B.

S317. The user equipment sends configuration information of the target parameter to the network device.

The configuration information of the target parameter includes a maximum output power gain, a carrier frequency range, a bandwidth range, and/or a correspondence determined by the user equipment.

Optionally, the configuration information of the target parameter is sent by the user equipment to the network device by using the RRC or the MAC CE.

It should be noted that the correspondence determined by the user equipment may be a preset correspondence determined by the user equipment. This is not specifically limited in this embodiment of this application.

Specifically, with reference to FIG. 2, the processor 201 in the computer device 200 may be configured to support the user equipment in performing step S317 in this embodiment of this application.

Optionally, the configuration information of the target parameter is sent by the user equipment to the network device by using the RRC or the MAC CE.

S315A. The network device receives the configuration information that is of the target parameter and that is sent by the user equipment.

S315B. The network device determines the value of the target parameter or the target preset correspondence based on the configuration information of the target parameter.

Specifically, with reference to FIG. 2, the processor 201 in the computer device 200 may be configured to support the network device in performing steps S315A and S315B in this embodiment of this application.

Optionally, after S315A, step S318 is further included. Step S312 may specifically include S312C1 and S312C2.

S318. The network device sends acknowledgement configuration information of the target parameter to the user equipment.

The acknowledgement configuration information of the target parameter is determined by the network device based on the configuration information that is of the target parameter and that is sent by the user equipment.

S312C1. The user equipment receives the acknowledgement configuration information that is of the target parameter and that is sent by the network device.

S312C2. The user equipment updates the modulation scheme in the K modulation scheme sets in the target MCS table according to the acknowledgement configuration information of the target parameter.

It should be noted that when the network device determines that the target MCS table sent by the user equipment cannot be used, the configuration information that is of the target parameter and that is sent by the network device may not carry a re-indicated MCS table. In this scenario, the user equipment does not update the MCS table in the user equipment, and uses an original MCS table in the user equipment.

It should be noted that, in Embodiment 2, the network device may perform the foregoing method on one user equipment, a group of user equipments, or all user equipments in a cell. This is not specifically limited in this embodiment of this application.

Specifically, with reference to FIG. 2, the processor 201 in the computer device 200 may be configured to support the network device in performing step S318 in this embodiment of this application, and the processor 201 may be further configured to support the user equipment in performing steps S312C1 and S312C2 in this embodiment of this application.

According to the communication method provided in this embodiment of this application, before the network device and the user equipment communicate with each other by using the MCS table, a target MCS table suitable for a current use scenario needs to be determined. The network device or the user equipment may flexibly determine the target MCS table and update the MCS table in a plurality of manners, so as to provide a basis for flexible communication between the network device and the user equipment.

The foregoing mainly describes the solutions provided in the embodiments of this application from perspectives of the network device and the user equipment. It can be understood that, to implement the foregoing functions, the network device and the user equipment include corresponding hardware structures and/or software modules for performing the functions. Persons skilled in the art should be easily aware that, in combination with the examples described in the embodiments disclosed in this specification, units and algorithms steps may be implemented by hardware or a combination of hardware and computer software. Whether a function is performed by hardware or computer software driving hardware depends on particular applications and design constraints of the technical solutions. Persons skilled in the art may use a different method to implement the described functions for each particular application, but it should not be considered that the implementation goes beyond the scope of this application.

In the embodiments of this application, the network device and the user equipment may be divided into function modules based on the foregoing method examples. For example, each function module may be obtained through division in correspondence to each function, or at least two functions may be integrated into one processing module. The integrated module may be implemented in a form of hardware, or may be implemented in a form of a software function module. It should be noted that the module division in the embodiments of this application is an example and is only logical function division. There may be other division manners in actual implementation.

Figure 8:
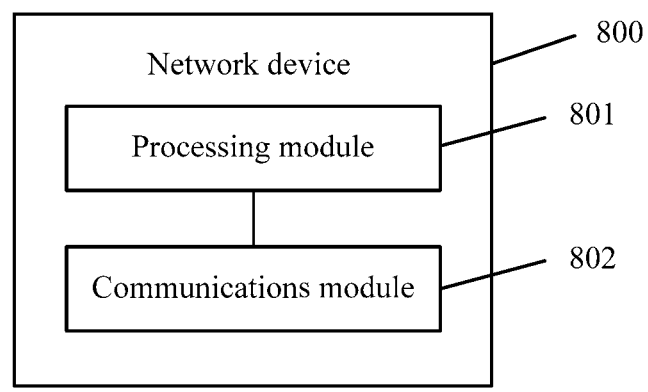
FIG. 8 is a schematic structural diagram of a network device according to an embodiment of this application.

When the function modules are divided through integration, FIG. 8 is a possible schematic structural diagram of the network device in the foregoing embodiments. As shown in FIG. 8, a network device 800 includes a processing module 801 and a communications module 802. The processing module 801 is configured to support the network device 800 in performing steps S101, S103, S103A, S103B, S103C, S103D, S104, S104A, S105, S105A, and S106 in the foregoing method embodiment. The communications module 802 is configured to support the network device 800 in performing step S102 in the foregoing method embodiment. Alternatively, the processing module 801 is further configured to support the network device 800 in performing steps S301, S305, S305A, S305B, S305C, S305D, S305E, S305F1, S305F2, S309, S311, S311A, S315, S315A, and S315B in the foregoing method embodiment. The communications module 802 is further configured to support the network device 800 in performing steps S302, S308, S313, and S318 in the foregoing method embodiment. All related content of steps in the foregoing method embodiments may be cited in function descriptions of corresponding function modules. Details are not described herein again.

Figure 9:
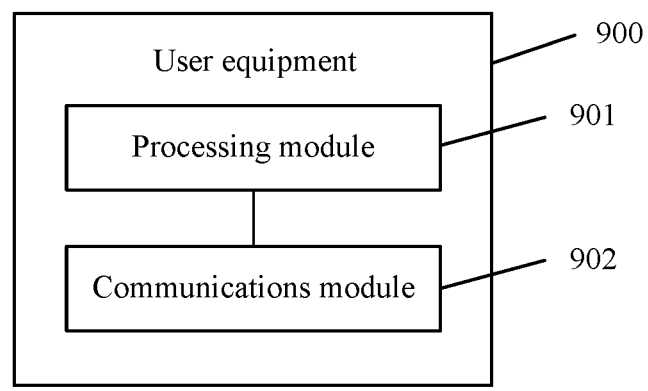
FIG. 9 is a schematic structural diagram of user equipment according to an embodiment of this application.

When the function modules are divided through integration, FIG. 9 is a possible schematic structural diagram of the user equipment in the foregoing embodiments. As shown in FIG. 9, user equipment 900 includes a processing module 901 and a communications module 902. The processing module 901 is configured to support the user equipment 900 in performing steps S201, S203, S203A, S203B, S203C, S203D, S204, S204A, S204B, S205, S205A, and S206 in the foregoing method embodiment. The communications module 902 is configured to support the user equipment 900 in performing step S202 in the foregoing method embodiment. The processing module 901 is further configured to support the user equipment 900 in performing steps S303, S306, S306B1, S306B2, S306B3, S306B4, S306A1, S306A2, S310, S312, S312A, S312B, S312C1, S312C2, and S316 in the foregoing method embodiment. The communications module 902 is further configured to support the user equipment 900 in performing steps S304, S307, S314, and S317 in the foregoing method embodiment. All related content of steps in the foregoing method embodiments may be cited in function descriptions of corresponding function modules. Details are not described herein again.

This application provides a network device. The network device may be the network device in the foregoing method design, or may be a chip disposed in the network device. The network device includes: a memory configured to store computer executable program code, a communications interface, and a processor. The processor is coupled to the memory and the communications interface. The program code stored in the memory includes an instruction. When the processor executes the instruction, the network device performs the communication method performed by the network device in any one of the foregoing possible designs.

This application provides user equipment. The user equipment may be the user equipment in the foregoing method design, or may be a chip disposed in the user equipment. The apparatus for sending a signal includes: a memory configured to store computer executable program code, a communications interface, and a processor. The processor is coupled to the memory and the communications interface. The program code stored in the memory includes an instruction. When the processor executes the instruction, the user equipment performs the communication method performed by the user equipment in any one of the foregoing possible designs.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid state drive (SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of a plurality of. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
receiving, by a first communication device, a target modulation and coding scheme (MCS) index from a second communication device;
determining, by the first communication device, a target modulation scheme corresponding to the target MCS index based on a correspondence between a plurality of MCS indexes and a plurality of modulation schemes, wherein in the correspondence, at least one MCS index of the plurality of MCS indexes corresponds to one modulation scheme in a set of modulation schemes, the set of modulation schemes comprising: π/2 binary phase shift keying (π/2-BPSK) modulation and quadrature phase shift keying (QPSK) modulation; and
performing, by the first communication device, communication with the second communication device based on the target modulation scheme corresponding to the target MCS index;
wherein the plurality of MCS indexes includes MCS index 1, and a spectral efficiency corresponding to the MCS index 1 is 0.3066.

2. The method according to claim 1, wherein the at least one MCS index is 0 or 1.

3. The method according to claim 1, wherein the set of modulation schemes is represented by a modulation order of q, wherein q is configured to be 1 if π/2-BPSK modulation is supported by the first communication device, and q is configured to be 2 if π/2-BPSK modulation is not supported by the first communication device.

4. The method according to claim 3, wherein the plurality of MCS indexes includes MCS index 0, and a spectral efficiency corresponding to the MCS index 0 is 0.2344.

5. The method according to claim 3, wherein the plurality of MCS indexes includes MCS index 0, and a target code rate corresponding to the MCS index 0 is 240/q.

6. The method according to claim 3, wherein the plurality of MCS indexes includes MCS index 1, and a target code rate corresponding to the MCS index 1 is 314/q.

7. The method according to claim 1, wherein a part of the correspondence is represented by following table:

| MCS index | Modulation order | Target code rate * 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 | q is configured to be 1 or 2, wherein 1 is corresponding to π/2-BPSK modulation, and 2 is corresponding to QPSK modulation.

8. The method according to claim 1, further comprising:
reporting, by the first communication device to the second communication device, information about whether the first communication device supports π/2-BPSK modulation.

9. The method according to claim 1, further comprising:
when the first communication device does not supports π/2-BPSK modulation, determining, by the first communication device, that the target modulation scheme corresponding to the target MCS index is QPSK modulation.

10. The method according to claim 1, wherein both MCS index 0 and MCS index 1 in the plurality of MCS indexes correspond to the set of modulation schemes.

11. An apparatus, comprising:
one or more memories configured to store instructions; and
one or more processors coupled to the one or more memories and configured to execute the instructions to cause the apparatus to:
receive a target modulation and coding scheme (MCS) index from a second communications device;
determine a target modulation scheme corresponding to the target MCS index based on a correspondence between a plurality of MCS indexes and a plurality of modulation schemes, wherein in the correspondence, at least one MCS index of the plurality of MCS indexes corresponding to one modulation scheme in a set of modulation schemes, the set of modulation schemes comprising: π/2 binary phase shift keying (π/2-BPSK) modulation and quadrature phase shift keying (QPSK) modulation; and
perform communication with the second communications device based on the target modulation scheme corresponding to the target MCS index;
wherein the plurality of MCS indexes includes MCS index 1, and a spectral efficiency corresponding to the MCS index 1 is 0.3066.

12. The apparatus according to claim 11, wherein the at least one MCS index is 0 or 1.

13. The apparatus according to claim 11, wherein the set of modulation schemes is represented by a modulation order of q, wherein q is configured to be 1 if π/2-BPSK modulation is supported by the apparatus, and q is configured to be 2 if π/2-BPSK modulation is not supported by the apparatus.

14. The apparatus according to claim 13, wherein the plurality of MCS indexes includes MCS index 0, and a spectral efficiency corresponding to the MCS index 0 is 0.2344.

15. The apparatus according to claim 13, wherein the plurality of MCS indexes includes MCS index 0, and a target code rate corresponding to the MCS index 0 is 240/q.

16. The apparatus according to claim 13, wherein the plurality of MCS indexes includes MCS index 1, and a target code rate corresponding to the MCS index 1 is 314/q.

17. The apparatus according to claim 11, wherein a part of the correspondence is represented by following table:

| MCS index | Modulation order | Target code rate * 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |

-continued

| MCS index | Modulation order | Target code rate * 1024 | Spectral efficiency |
|---|---|---|---|
| 7 | 2 | 526 | 1.0273 |
| 8 | 2 | 602 | 1.1758 |
| 9 | 2 | 679 | 1.3262 | q is configured to be 1 or 2, wherein 1 is corresponding to $\pi/2$-BPSK modulation, and 2 is corresponding to QPSK modulation.

18. The apparatus according to claim 11, wherein the one or more processors are further configured to execute the instructions to cause the apparatus to:
  report information about whether the apparatus supports $\pi/2$-BPSK modulation to the second communications device.

19. The apparatus according to claim 11, wherein the one or more processors are further configured to execute the instructions to cause the apparatus to:
  when the apparatus does not supports $\pi/2$-BPSK modulation, determine that the target modulation scheme corresponding to the target MCS index is QPSK modulation.

\* \* \* \* \*